United States Patent
Ansari et al.

(10) Patent No.: US 11,968,109 B2
(45) Date of Patent: *Apr. 23, 2024

(54) SYSTEMS AND METHODS FOR IDENTIFYING CORRELATIONS OF CERTAIN SCENARIOS TO PERFORMANCE OF NETWORK COMMUNICATIONS

(71) Applicant: Hewlett Packard Enterprise Development LP, Spring, TX (US)

(72) Inventors: Abtin Ansari, Santa Clara, CA (US); Bernd Bandemer, Santa Clara, CA (US); Jose Tellado, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,843

(22) Filed: Nov. 4, 2022

(65) Prior Publication Data

US 2023/0109904 A1    Apr. 13, 2023

Related U.S. Application Data

(63) Continuation of application No. 17/508,879, filed on Oct. 22, 2021, now Pat. No. 11,496,386.

(60) Provisional application No. 63/115,569, filed on Nov. 18, 2020.

(51) Int. Cl.
*H04L 43/50* (2022.01)
*H04L 41/06* (2022.01)

(52) U.S. Cl.
CPC .............. *H04L 43/50* (2013.01); *H04L 41/06* (2013.01)

(58) Field of Classification Search
None
See application file for complete search history.

(56) References Cited

U.S. PATENT DOCUMENTS

| | | | |
|---|---|---|---|
| 9,349,103 B2 * | 5/2016 | Eberhardt, III | ........ G06N 20/00 |
| 9,576,031 B1 * | 2/2017 | Aggarwal | ........... G06F 18/2113 |
| 10,031,945 B2 | 7/2018 | Aggarwal et al. | |
| 10,084,805 B2 | 9/2018 | Nadolski et al. | |
| 10,289,473 B2 | 5/2019 | Mendes et al. | |
| 10,299,140 B2 | 5/2019 | Mahimkar et al. | |
| 10,409,367 B2 | 9/2019 | Velez-Rojas et al. | |
| 10,417,523 B2 | 9/2019 | Singh et al. | |
| 2009/0138304 A1 * | 5/2009 | Aharoni | ................. G06Q 30/02 705/7.33 |

(Continued)

*Primary Examiner* — Ranodhi Serrao
(74) *Attorney, Agent, or Firm* — Hewlett Packard Enterprise Patent Department

(57) ABSTRACT

Systems and methods are provided for receiving a set of feature vectors. Each feature vector in the set may comprise feature values for a plurality of features associated with network communications. A first score for a first subset of the feature vectors that have at least one common feature value for a first feature of the plurality of features may be determined. A second score for a second subset of the feature vectors may be determined. The second subset may comprise the first subset and other feature vectors that have a different feature value for the first feature. Based on a change between the first score and the second score, whether to group the common feature value and the different feature value together may be determined.

21 Claims, 15 Drawing Sheets

(56) References Cited

U.S. PATENT DOCUMENTS

| | | | |
|---|---|---|---|
| 2013/0198119 A1* | 8/2013 | Eberhardt, III | G06N 20/00 |
| | | | 706/12 |
| 2016/0267397 A1* | 9/2016 | Carlsson | G06F 16/35 |
| 2018/0035307 A1 | 2/2018 | Mahimkar et al. | |
| 2018/0174060 A1 | 6/2018 | Velez-Rojas et al. | |
| 2018/0241764 A1* | 8/2018 | Nadolski | H04L 63/20 |
| 2018/0276063 A1 | 9/2018 | Mendes et al. | |
| 2018/0285685 A1 | 10/2018 | Singh et al. | |
| 2019/0005115 A1 | 1/2019 | Warrier et al. | |
| 2019/0138912 A1 | 5/2019 | Modarresi et al. | |
| 2019/0361919 A1 | 11/2019 | Sahu et al. | |
| 2020/0118036 A1* | 4/2020 | Karnagel | G06N 3/088 |
| 2021/0011890 A1* | 1/2021 | Mdini | H04L 41/142 |

\* cited by examiner

| Failure Scenario | Failure Score | Failure Fraction | Failure Rate | Servers | Sites | AP Names | AP Models |
|---|---|---|---|---|---|---|---|
| 1 | 75 | 62% | 96% | Server_1, Server_2, Server_3 | All | AP_1, AP_2, AP_3 | All |

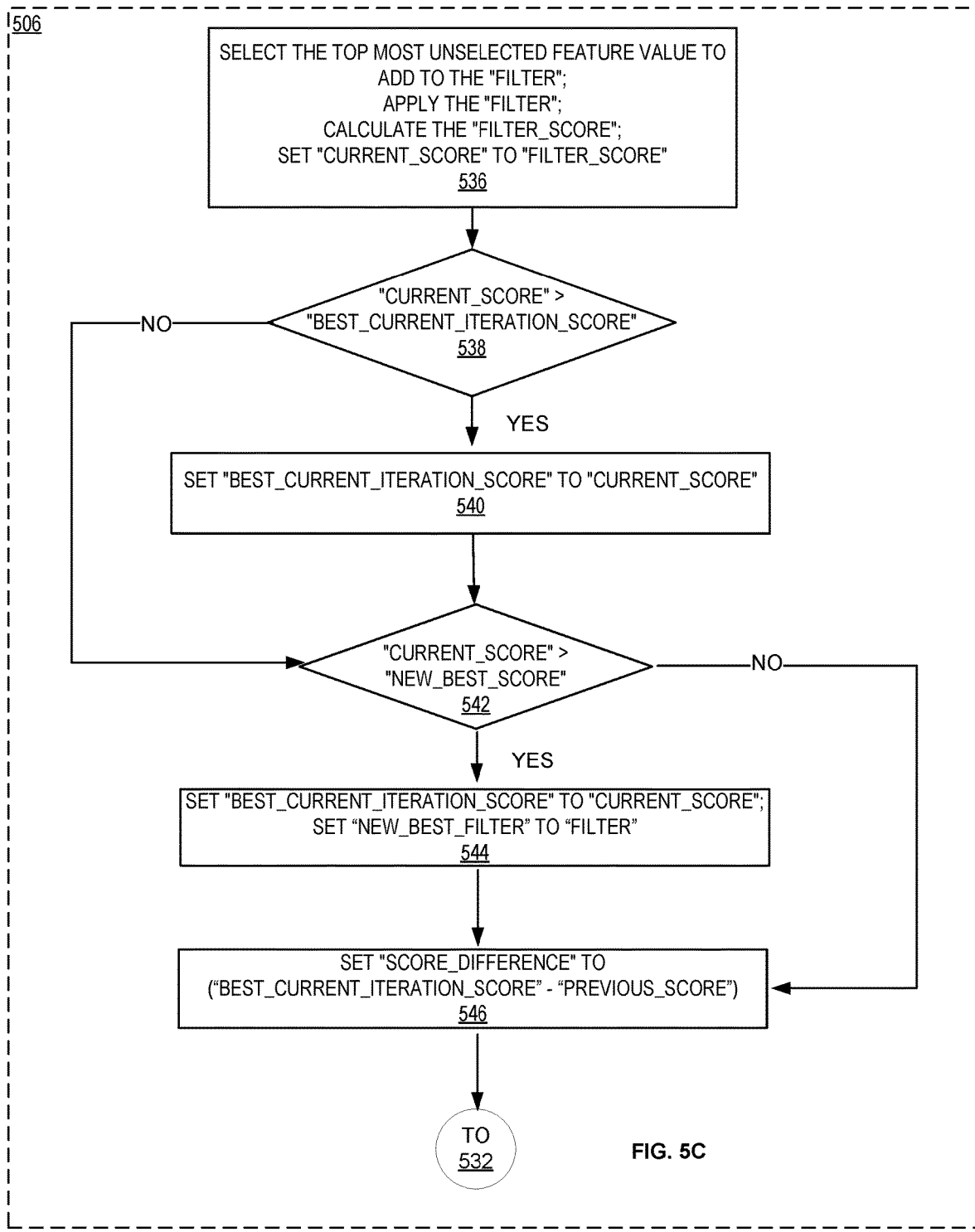

First iteration (i=1)
- filter = {Site: [all levels], Svrip: [Server_1, Server_2, Server_3, Server_4], Apmac: [all levels]}
- filter_score = 0.36
- new_best_score = 0.58 (not updated)
- new_best_filter = {Site: [all levels], Svrip: [Server_1, Server_2, Server_3], Apmac: [all levels]} (not updated)

SYSTEMS AND METHODS FOR IDENTIFYING CORRELATIONS OF CERTAIN SCENARIOS TO PERFORMANCE OF NETWORK COMMUNICATIONS

RELATED APPLICATIONS

This application is a Continuation of U.S. application Ser. No. 17/508,879 filed Oct. 22, 2021, issued as U.S. Pat. No. 11,496,386 on Nov. 8, 2022, which claims priority to U.S. Provisional Patent Application No. 63/115,569, filed on Nov. 18, 2020, the contents of which is incorporated herein by reference in its entirety.

BACKGROUND

Network communications involve various combinations of entities, equipment, access nodes, communication paths, or the like. Some combinations may disproportionately affect network communications than others.

BRIEF DESCRIPTION OF THE DRAWINGS

The present disclosure, in accordance with one or more various example implementations, is described in detail with reference to the following figures. The figures are provided for purposes of illustration only and merely depict typical or example implementations.

FIG. 4 is an example scenario reporting data structure, according to example implementations of the present technology.

FIGS. 5A-5C illustrate an example flowchart of a feature value combination process, according to example implementations of the present technology.

Figure 1:
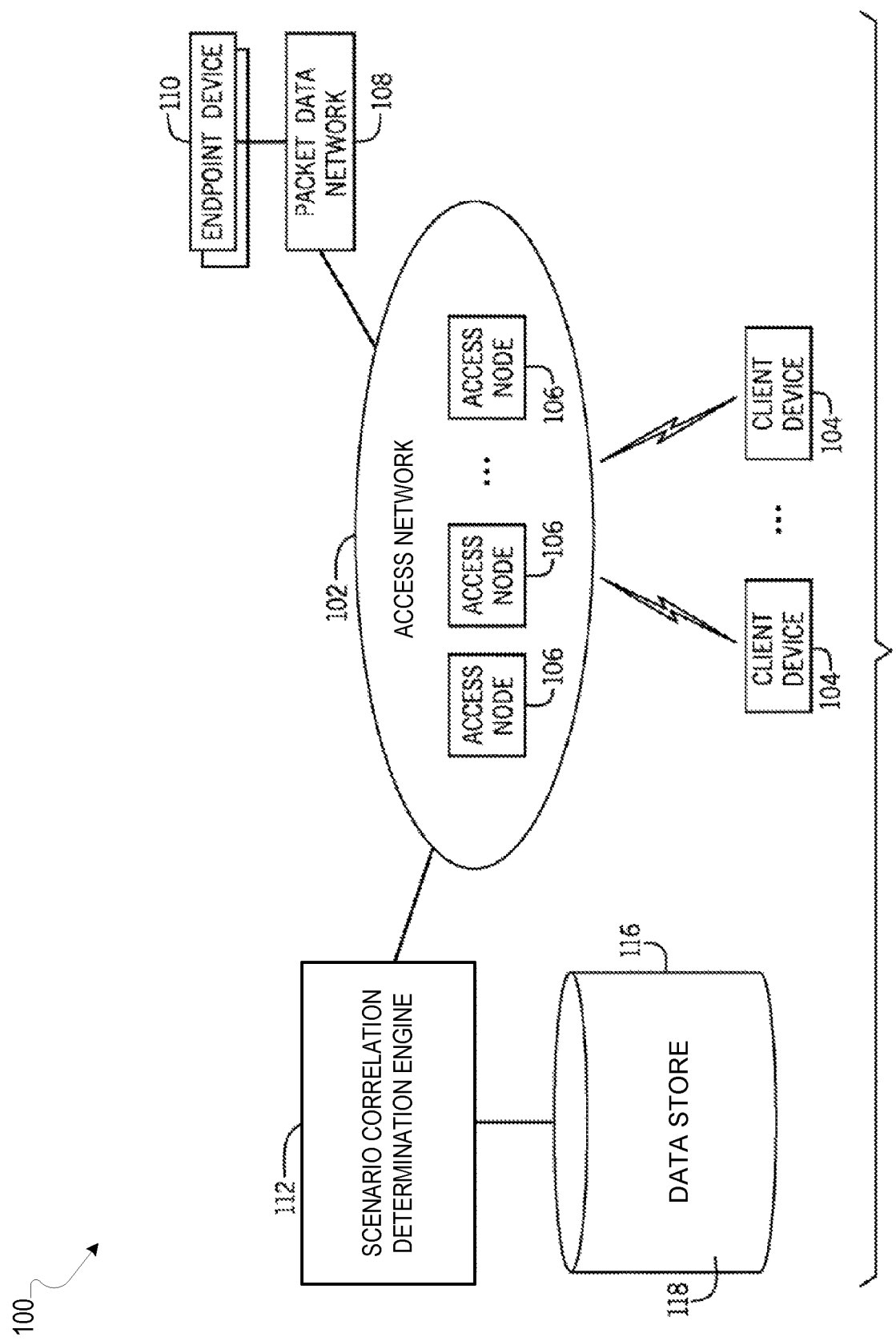
FIG. 1 is a block diagram of an arrangement including a network and a scenario correlation determination engine, according to example implementations of the present technology.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Network communications involve various combinations of entities, equipment, access nodes, communication paths, or the like. Network communication transmitting requests and responses of the requests can be associated with one or more performance metrics, such as a metric measuring losses of the network communications or a metric measuring signal-to-noise ratio (SNR). In evaluating reliability of the network communications, it is important to identify when and how much such performance metrics are affected by different contexts of the network communications. When a particular context is associated with a significant degradation of the performance metric, the particular context may be indicative of a cause of the degradation. For example, it may be determined that a significant number or rate of network communications that pass through a particular access point (AP) fails according to a performance metric (e.g., a failure rate metric). The failures are symptoms that may, collectively, indicate a cause of the failures associated with the particular access point. It is noted that the above example is grossly simplified. In real world implementations, a network may exhibit degraded performance metric that results from not only a particular access point, but combinations of multiple access points, gateways, sites, servers, service set identifiers (SSID), hardware, software, configurations, or the like. For example, an access point may generally exhibit acceptable performance metric, but the access point may exhibit degraded performance metric when it is combined with a particular server using a particular configuration. A total number of possible combinations may be astronomical and provide various challenges. For example, a network that has 3 SSID, 6 sites, 4 servers, 270 Aps, and 1600 client devices may provide approximately 31 million possible combinations. Each of these combinations may potentially be associated with unacceptably severe degradation of performance. Identifying which of the 31 million possible combinations may cause the degradation may be a humbling task for even the best computers of today. Conventional approaches fail in providing a realistic solution for identifying a subset of combinations that may potentially cause disproportionate degradation in performance metrics.

An improved approach rooted in computer technology overcomes the foregoing and other disadvantages associated with conventional approaches specifically arising in the realm of computer technology. Based on computer technology, the present technology may provide improved techniques of automatically determining combinations of network elements and/or additional parameters that are likely to disproportionately affect network communications. Further, the present technology may order the determined combinations by severity of each combination. Using the present technology, network providers and administrators may effectively determine potential root-causes of network communication problems by focusing on combinations that disproportionately affect network communications first. The technical improvements can be reflected in technical fields of network monitoring and management. Specifically, examples of this disclosure enable ready and automatic determinations of combinations of network elements and/or parameters that disproportionately affect network latency, signal strength, signal-to-noise ratio, or other network performances. The determinations involve systematic analysis of collected network traffic that cannot be practically performed by human and human mind. Further details are below.

FIG. 1 is a block diagram of an example arrangement that includes a scenario correlation determination engine 112. The example arrangement 100 includes an access network 102 to which various client devices 104 are able to connect. The access network 102 may be a wireless local area network (WLAN) that operates according to the IEEE 802.11 standards. Alternatively or additionally, the access network 102 may be a cellular network or other type of network, for example, a wired network. The access network 102 includes various access nodes 106. Each access node 106 may have a respective coverage area. If a client device 104 is within the coverage area of a particular access node 106, then the client device 104 may establish a connection with the particular access node 106.

Once a client device 104 establishes a connection with an access node 106, the client device 104 may perform network communications through the access network 102 with a packet data network 108, or other type of network. For example, the packet data network 108 may include a public network such as the Internet. Alternatively, the packet data network 108 may include a local area network (LAN) or a wide area network (WAN) of a particular enterprise, such as a company, an educational organization, a government agency, or an individual.

Endpoint devices 110 may be connected to the packet data network 108. The endpoint devices 110 may include any or some combination of the following: user devices, server computers, storage systems, and so forth.

In accordance with some implementations of the present disclosure, a scenario correlation determination engine 112 may examine each combination of network elements and/or additional parameters to determine whether the combination shows strong correlation to network performance compared to individual constituent network element or a parameter. For instance, a combination of a particular router and a particular internet service provider (ISP) can cause a significant portion of network traffic to be dropped when the router alone or the router combined with another ISP does not. The collection of network elements and/or additional parameters may represent a dominant scenario associated with a particular performance metric (e.g., outcome, signal-to-noise ratio, signal strength, network latency), such as failure or success of network communication. More details regarding the scenario correlation determination engine 112 are provided below with respect to FIG. 2 and FIG. 3. An "engine" may refer to a hardware processing circuit, which includes any or some combination of the following: a microprocessor, a core of a multi-core microprocessor, a microcontroller, a programmable integrated circuit device, a programmable gate array, or any other type of hardware processing circuit. Alternatively, an "engine" may refer to a combination of a hardware processing circuit and machine-readable instructions executable on the hardware processing circuit.

The scenario correlation determination engine 112 may access various parameters (e.g., features and feature values) associated with network communications. A network communication may originate from, transmitted through, or transmitted to a combination of network elements and have associated transmission parameters. For example, a network communication may be associated with an example combination of identifiers {site="STORE1_00851", server ip="8.8.4.4", device model="325", firmware="8.5.0.1", access point MAC address="f05c19cf8ece", access point name="s100851a004"} and additional metrics {success_count="1000", fail_count="500", SNR="0.71"}. Here, the example combination of identifiers and parameters (referred as a "combination" hereforth) provides features relating to network elements that include site identifier, server IP address, device model, firmware, access point MAC address, and access point name. The example combination additionally provides values (e.g., feature values) that correspond to the features. For instance, in the example combination, a feature "site" has a corresponding feature value "STORE1_00851". Further, the example combination provides additional metrics relating to performance for the combination of network elements including a "success_count", "fail_count", and an "SNR" with respective metric values that are observed over a specified period of time. It is noted that the list of features, feature values, and metrics are not limiting and fewer or additional features and feature values are possible in a combination.

The features and feature values may be measured, obtained, or inferred by network devices and/or monitors based on monitored information in the network. The network communications may be monitored or snooped by the network devices and/or monitors. The network communications may relate to establishing a connection between an entity and another entity (e.g., a client device 104 and an access node 106), data transfer between the entities, a termination of a connection between the entities, and so forth. In some example implementations, combinations of feature values representing network communications may be stored as records 118 in a data store 116 accessible by the scenario correlation determination engine 112. The data store 116 may be implemented using a storage device or an arrangement of multiple storage devices. In other examples, the records 118 may be received in real-time for processing by the scenario correlation determination engine 112 from the data store 116.

Figure 2:
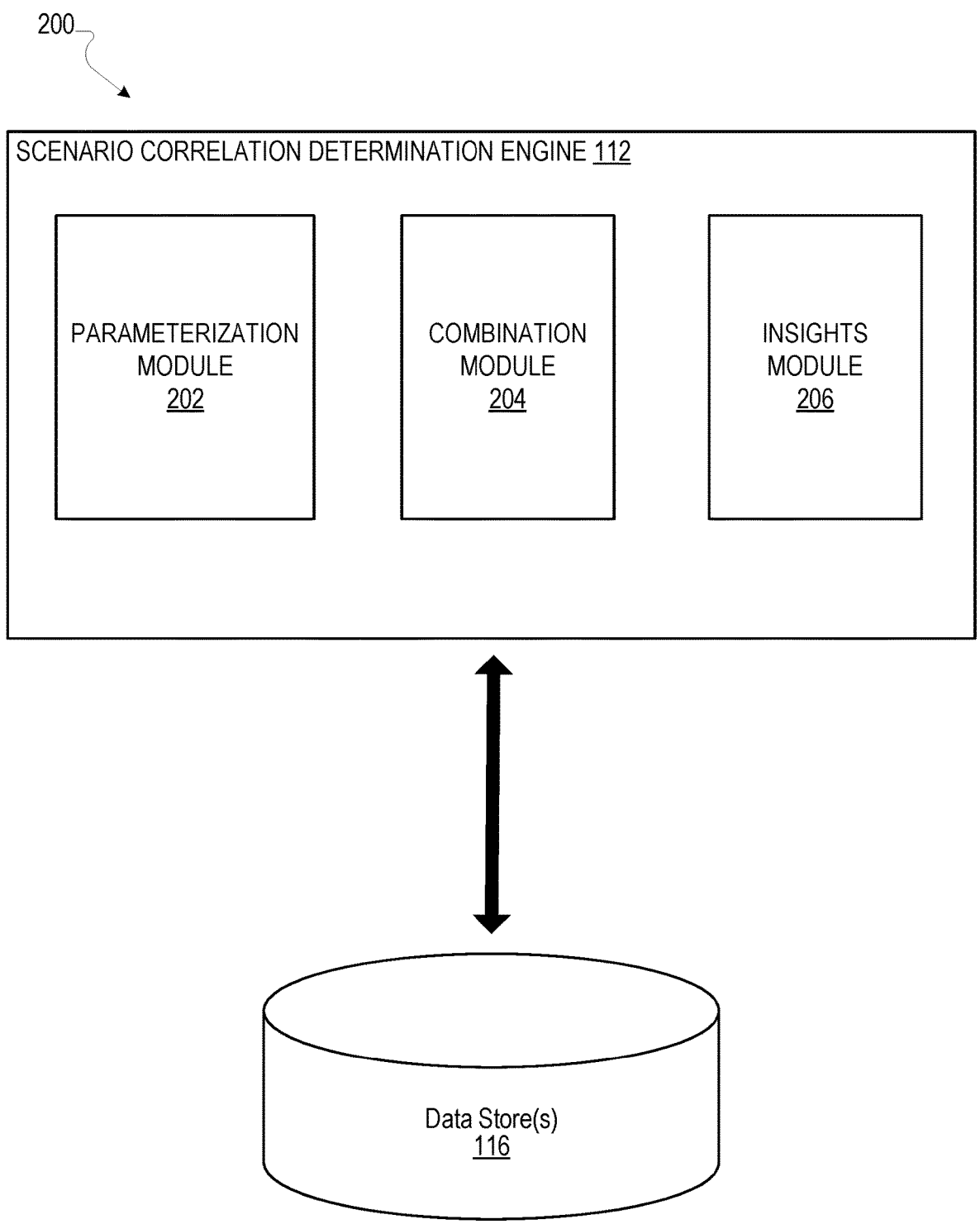
FIG. 2 is a block diagram of the scenario correlation determination engine, according to example implementations of the present technology.

FIG. 2 is a block diagram 200 of the scenario correlation determination engine 112, according to example implementations of the present technology. The scenario correlation determination engine 112 may include a parameterization module 202, combination module 204, and insights module 206. The modules in this figure and all figures herein are exemplary only, and other implementations may include additional, fewer, integrated or different components. Some modules may not be shown so as not to obscure relevant details.

In some example implementations, the various modules and/or applications described herein may be implemented, in part or in whole, as software, hardware, or any combination thereof. In general, a module and/or an application, as discussed herein, may be associated with software, hardware, or any combination thereof. In some implementations, one or more functions, tasks, and/or operations of modules and/or applications may be carried out or performed by software routines, software processes, hardware, and/or any combination thereof. In some cases, the various modules and/or applications described herein may be implemented, in part or in whole, as software running on one or more computing devices or systems, such as on a user or client computing device or on a server. For example, one or more modules and/or applications described herein, or at least a portion thereof, may be implemented as or within an application (e.g., app), a program, or an applet, or the like, running on a user computing device or a client computing system. In another example, one or more modules and/or applications, or at least a portion thereof, may be implemented using one or more computing devices or systems that include one or more servers, such as network servers or cloud servers. It should be understood that there may be many variations or other possibilities.

The parameterization module 202 may be configured to prepare a dataset for use with the combination module 204. To prepare the dataset, the parameterization module 202 may receive feature vectors comprising features and feature values associated with network communications from the data store 118. For example, a feature vector may be a vector of features, for example: {site, server IP, AP MAC address, . . . }, feature values, for example: {"STORE1_00851", "8.8.4.4", "f05c19cf8ece", . . . } associated with the features, and the corresponding metrics, for example: {success_ count, fail_count, SNR} and metric values, for example: {"1000", "500", "0.71"}. The parameterization module 202 may select some of the features based on combinations of parameters and/or metrics to be evaluated by the combination module 204. For instance, in the above example, features {site, AP MAC address} may be selected such that combinations comprising feature values of the features can be evaluated by the combination module 204. Selected features may define combinations of feature values that collectively represent network configurations. For instance, where features {site, server IP} are selected, feature values {"STORE1_00851", "8.8.4.4"} defines a combination that collectively represent a particular network configuration. The parameterization module 202 may disregard redundant or otherwise less meaningful features.

The parameterization module 202 may merge or split some features and corresponding values in the dataset. For instance, the parameterization module 202 may merge features {site, server IP} to provide a feature {"site-server IP"} that has a corresponding merged feature value {"STORE1_00851-8.8.4.4"}. In some example implementations, the parameterization module 202 may modify various aspects and data of a dataset to prepare the dataset for use with other modules, such as the combination clustering module 204. For example, the parameterization module 202 may be configured to treat feature vectors with significantly bad SNR metric values (e.g., <−75 dB) to be similar to feature vectors with low success_count metric value (e.g., <10 successes). The parameterization module 202 may update those feature vectors to have the "FAIL" status as a metric value and, optionally, truncate the SNR metric in the dataset.

In some example implementations, the parameterization module 202 may determine, generate, and translate some metric values of a dataset based on statistics of peer networks involved in similar network communications in comparable networks. For example, a metric in the dataset may be SNR having a continuous (or dynamic) range of metric values in decibels (e.g., −20 dB to 20 dB). As another example, a metric may be ping delay having a continuous range of metric values in microseconds (e.g., 0 ms to 1,000 ms, and above). The parameterization module 202 may translate these types of continuous range metric values to discrete range metric values based on statistics of peer networks. For example, the statistics of peer networks may indicate that an SNR of +1.5 dB is a threshold acceptable value in the peer networks. The threshold acceptable value may be determined by aggregating, filtering, or otherwise processing SNR of the peer networks. Using the threshold acceptable value, the parameterization module 202 may translate +2.0 dB SNR in the dataset to a discrete value "TRUE" and +1.4 dB SNR to a different discrete value "FALSE". Similarly, when peer networks indicate that a ping delay of 50 ms is a threshold acceptable value, the parameterization module 202 may translate 45 ms in the dataset to a discrete value "PASS" and 75 ms to "FAIL". While the examples use discrete values of "TRUE", "FALSE", "PASS", "FAIL", other discrete values or enumerations may be used.

The combination module 204 may be configured to determine one or more scenarios that disproportionately affect network communications (e.g., cause the network communications to result in greater or lesser successes/failures). A scenario may represent a combination of feature values that collectively exhibit a strong correlation to one or more performance metrics. In other words, a scenario is a combination of feature values that may disproportionately affect network communications. For instance, a particular router device type combined with a particular server type may exhibit disproportionately high failure rate (e.g., a performance metric) compared to the router device type combined with other server types. A degree of correlation, such as a strong correlation or a weaker correlation, of a combination to the performance metrics may be measured based on a score that determines potential associations between or among different combinations. More details on the score is provided with respect to a metric calculation module 302 of FIG. 3. The combination module 204 may use a dataset provided by the parameterization module 202 to group or cluster different combinations together.

The insights module 206 may be configured to provide insights on scenarios that disproportionately affect network communications. The insights may be for scenarios determined by the combination module 204 (e.g., a scenario can be a combination of feature values). Some insights that the insights module 206 may provide include information on the determined scenarios and related statistics. For example, the insights module 206 may provide "total of 2 failure scenarios were found" or "the top failure scenario comprises 82% of all network communication failures." Further, the insights module 206 may describe combinations in the scenarios, such as "the top failure scenario involved {site='Site_1', server IP address(es)='Server_1, Server_2', AP(s)='AP_1'}. The insights module 206 may further provide comparative statistics between a network and another network, such as "overall, DNS Connection Loss rate is 21% which is worse than 91% of peers."

In some example implementations, the insights module 206 may provide recommendations on how to remediate or otherwise improve performance of network communications. The insights module 206 may pinpoint one or more network elements that disproportionately affect network communications and suggest examining the network elements. For example, the insights module 206 may suggest examining a firmware version installed on a router. As another example, the insights module 206 may suggest that the firmware version of the router combined with a server equipment may be disproportionately causing (i.e., is a root-cause of) failures. Accordingly, the insights module 206 may identify root-causes (e.g., dominant scenarios) of network communication problems and recommend remedial actions. Some example remedial actions can include updating/reverting firmware versions, replacing one or more network devices, changing ISP, or the like.

As shown in FIG. 2, the scenario correlation determination engine 112 may be configured to communicate with a data store 116. The data store 116 may be configured to store and maintain various types of data to support the functionality of the scenario determination engine 112. For example, the data store 116 may store datasets of feature and metric vectors associated with network communications. Additionally, the data store 116 may be configured to store input files, byproducts, output files, or any other data for the parameterization module 202, combination module 204, and insights module 206. For example, the data store 116 may be configured to store datasets, filtered datasets, identified scenarios, corresponding metric values, statistics relating to the scenarios, statistics of peer networks, or the like.

Figure 3:
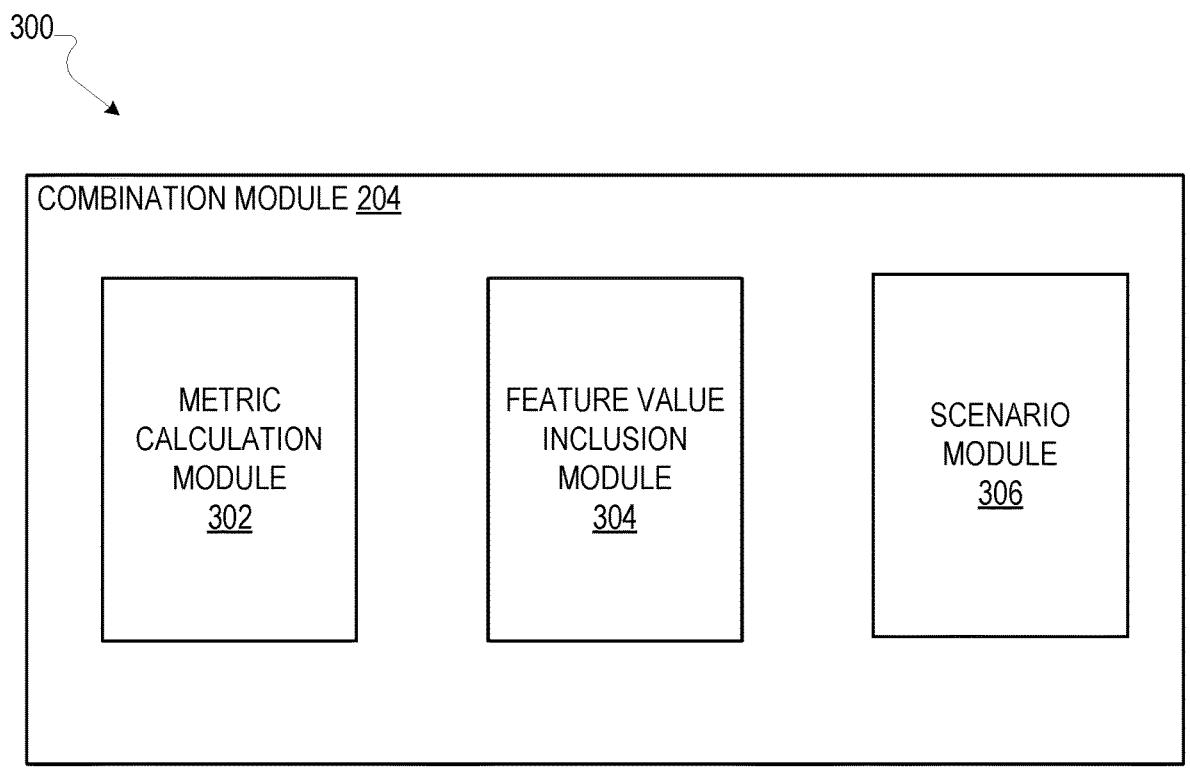
FIG. 3 is a block diagram of a combination module, according to example implementations of the present technology.

FIG. 3 is a block diagram 300 of the combination module 204, according to example implementations of the present technology. A combination may be a collection of one or more feature values. The combination module 204 may be configured to combine feature values to determine a combination (e.g., a scenario) that disproportionately affect network communications. The combination module 204 may include a metric calculation module 302, a feature value inclusion module 304, and a scenario module 306.

The metric calculation module 302 may be configured to calculate a metric value which may be in the form of a score that represents how much one or more combinations affect performance metrics. The score calculated for a combination may reflect how many network traffic resulting in certain outcome (e.g., performance metric) are associated with the combination rather than associated with other combinations. As one method of calculating the score, using a failure condition as an example of the performance metrics, the score may be calculated based on how many of the attempts result in a failure condition using failure rate and failure fraction.

The failure rate may be defined as total failures associated with the combination in relation to a total number of attempts associated with the combination. An example formula for the failure rate is provided below:

$$\text{failure rate} = \frac{\text{total failures of the combination}}{\text{total attempts of the combination}} \quad \text{(Eq. 1)}$$

Consider an example dataset that comprises 500,000 failure conditions. Further, consider an example combination associated with 100,000 total attempts in the example dataset. For the example combination, assume 50,000 attempts resulted in a failure condition. The failure rate for the example combination is 0.5 (i.e., 50,000 divided by 100,000). Thus, the failure rate may be a measure of how likely the failure condition occurred for a specific combination.

The failure fraction may be defined as a total number of failures associated with a specific combination in relation to a total number of failures in a dataset (e.g., the example dataset). An example formula for the failure fraction is provided below:

$$\text{failure fraction} = \frac{\text{total failures of the combination}}{\text{total failures of the dataset}} \quad \text{(Eq. 2)}$$

Accordingly, in the example dataset described above, since there are total of 500,000 failure conditions in the dataset, the failure fraction is 0.1 (i.e., 50,000 divided by 500,000). Thus, the failure fraction may be a measure of what portion of the total failures is for the specific combination.

In some example implementations, the metric calculation module 302 may calculate a score for a specific combination based on a rate and a fraction. The score may be indicative of how much the combination contributes to the performance metric. Various methodologies may be used to calculate the score. In one example implementation, the score may be calculated as a harmonic mean of the rate and the fraction. For example, the score may be calculated with a harmonic mean score formula provided below:

$$\text{score} = \frac{2 * \text{rate} * \text{fraction}}{\text{fraction} + \text{rate}} \quad \text{(Eq. 3)}$$

Continuing with the example of the failure condition above, the performance metric is failed communication, the rate is the failure rate, and the fraction is the failure fraction. Thus, the score for the example is approximately 0.16667 (i.e., the score=2*0.5*0.1/0.6).

In some example implementations, the score may be weighted to account for a tradeoff between the fraction and the rate. An example formula that provides such weighting is provided below:

$$\text{score\_beta} = \frac{(1 + \beta^2) * \text{rate} * \text{fraction}}{(\beta^2 * \text{rate}) + \text{fraction}} \quad \text{(Eq. 4)}$$

In the above formula, a weighting factor β value less than 1 gives more weight to the rate term and adjusts the score (i.e., "score_beta" is a weighted score).

The metric calculation module 302 may receive feature vectors from the parameterizations module 202. Each feature vector comprises features and feature values. The feature vectors may be used to filter a dataset based on a feature value or a combination of multiple feature values. A filter in this example implementation may be a combination used to condition the original dataset and create a filtered dataset that is a subset of the original dataset. Score may be calculated for the filtered datasets which is the score of the combination. For example, assume that feature vectors in an example dataset has 3 features, each with 3, 1, and 2 respective feature values. The example of features in the dataset may be represented as {'feature_1':{A, B, C}, feature_2':{D}, feature_3':{E, F}}. In the example dataset, there are 63 possible combinations of feature values which may be expressed as {{A}, {B}, {C}, {D}, {E}, {F}, {A,B}, {A,C}, . . . , {A,F}, {B,C}, . . . , {A, B, C, D, E, F}}. When the example dataset is filtered with a feature value "A", the filtered dataset only has value of "A" for 'feature_1'. A score may be calculated using Eq. 3 or Eq. 4 for a filtered dataset. Similarly, a score may be calculated for each of the 63 filtered datasets that represent possible combinations.

The scores may provide meaningful insight into how strongly a feature value or a combination of feature values are correlated with one or more particular performance metrics. Further, feature values may be sorted based on corresponding scores to provide a sorted list of feature values that may be utilized by the combination module 204. In some example implementations, the combination of feature values may extend further than combining the feature values that are next to each other in the sorted list which may be implemented to allow the combination clustering process to better capture combinations that would otherwise not be captured.

It is noted that the above metrics of rate, fraction, and score may apply to other performance metrics, such as successes in network communications. Instead of searching for feature vectors that are associated with a failure condition, feature vectors may be combined such that they result in the maximum number of success conditions. Further, instead of a failure rate and a failure fraction, a success rate and a success fraction may be calculated. Calculating scores for the success conditions may provide insight into which scenario is the "best scenario" that is likely associated with fewest failures. Inspecting the best scenario and comparing it to the other feature values of the networks may give clues to why other feature values are having higher failures. For instance, when only the best scenario is associated with a router updated to the latest firmware, the best scenario can give clues that other routers should be updated to the latest firmware to lower respective failures.

The feature value inclusion module 304 may be configured to combine two or more feature values that, together, increase strength of correlation to one or more performance metrics. The combined feature values may provide a new combination that has stronger correlation to the performance metrics than the combinations that individually includes a constituent feature value.

In some example implementations, the feature value inclusion module 304 may utilize an algorithm that may determine a combination of feature values (e.g., a scenario) that is best correlated with a particular metric. The algorithm may be a greedy algorithm that may add feature values one by one to a combination of feature values based on a determination that the feature values increase correlation to one or more performance metrics. For example, provided a dataset, the greedy algorithm may determine a "base score" for the entire dataset that represents correlation of the dataset to the performance metrics. The base score is a score of a combination that has all features and all feature values of all feature vectors. The greedy algorithm may select a feature value of a feature and generate a filtered dataset that must include all feature vectors comprising the selected feature value. The greedy algorithm may then calculate a first score for the filtered dataset to determine whether a combination of feature values of the filtered dataset provides a greater score than the base score. When the first score is greater than the base score, it may be determined that the feature value is strongly correlated to the performance metrics.

The greedy algorithm may add a second feature value of the feature to a filter previously comprising the first feature value then filter the dataset with the updated filter to generate a second filtered dataset. The greedy algorithm may calculate a second score for the second filter. When the second score is greater than the first score, it may be determined that a combination of the first feature value and the second feature value makes a correlation of the feature stronger. When the second score is less than the first score, it may be determined that the second feature value does not increase strength of the correlation and the second feature value should not be combined with the first feature value. In each iteration, other features are also examined for their respective feature values following the same process of selecting one or more feature values, filtering the dataset, and comparing scores to determine whether the selected feature values of the other features may provide greater scores. The greedy algorithm may keep track of a combination of feature values that resulted in the strongest correlation and a score associated with the combination.

In the next iteration, the combination of feature values for a feature that resulted in the strongest correlation may be applied as a base filter to the dataset to generate a base filtered dataset. A top level feature value of a different feature may be selected and applied as an additional filter to the base filtered dataset. A score is calculated for the resulting set and additional feature values of the different feature may be added to the additional filter until the score no longer increases. When the score is greater than a score calculated in the previous iteration, the greedy algorithm may replace a previous combination of feature values and a score from the previous iteration with a combination of the feature values associated with the different feature that resulted in the stronger correlation. The greedy algorithm may keep track of the updated combination and the updated score. Each of the other features are examined similarly to determine whether a combination of feature values corresponding to the other features may provide even stronger correlation (i.e., provides a greater score than the updated score). The greedy algorithm may keep track of whichever combination of feature values that provide the strongest correlation and a score for the combination.

In the next iteration, the combination of feature values in a feature that provides the strongest correlation in the previous iteration may be applied as a base filter to the dataset to generate a base filtered dataset. The greedy algorithm may apply a similar process it applied in the previous iteration in this iteration. The greedy algorithm may keep track of whichever combination of feature values that provide the strongest correlation and a score for the combination.

In some example implementations, the greedy algorithm may terminate when a new score associated with a combination that provides the strongest correlation in the current iteration converges to a previous score associated with the strongest correlation in the previous iteration. The convergence may be determined based on a degree of closeness between the new score and the previous score. For example, the new score may be within a threshold value. In some example implementation, the greedy algorithm may terminate when a score calculated in a previous iteration is identical to a score calculated in the current iteration. In some example implementations, the greedy algorithm may terminate its iterative process when adding any of feature values do not increase the new score above the previous score. In some example implementations, the greedy algorithm may terminate when the new score has reached a threshold score, such as 0.80. In some example implementations, the greedy algorithm may terminate after a predetermined number of iterations. In some example implementations, the greedy algorithm may terminate when a filter from a previous iteration that provided a first score is identical to a filter determined in the current iteration that provides a second score. The greedy algorithm is described with more detail with regard to FIGS. 5A-5C.

After the algorithm terminates, a combination of feature values that provide the strongest correlation based on its associated score may be provided. The combination may represent a "scenario" of network communications in the dataset that likely most affects one or more performance metrics of the network communications.

In some example implementations, after the combination of feature values representing the scenario is determined, data associated with the combination may be filtered out from the dataset, resulting in a dataset with feature vectors that are unassociated with the combination already found. The greedy algorithm as described above may be applied to the resulting dataset to determine a second combination that is—albeit less so than the previously found scenario—also strongly correlated to the performance metric. The second combination may represent a secondary scenario. The same process may be repeated using the greedy algorithm to provide a tertiary scenario, and so forth that exhibit strong correlations, albeit less so, than previously found scenarios.

The scenario module 306 may be configured to manage results of the feature value inclusion module 304. The scenario module 306 may generate data structures suitable for reporting scenarios that have been determined. FIG. 4 illustrates an example scenario reporting data structure 400, according to example implementations of the present technology. The scenario module 306 may generate the data structure 400. The data structure 400 may comprise a scenario identifier 402, a score 404 associated with a scenario, a fraction 406 of a performance metric explained by the scenario, a rate 408 of a performance metric for the scenario, and one or more feature values 410, 412, 414, 416 for various features of the scenario. In the data structure 400, a list of servers 410 provides a collection of three feature values of {"Server_1", "Server_2", "Server_3"} that have been combined. Similarly, a list of AP names 414 provides a collection of two feature values of {"AP_1", "AP_2"} that have been combined. The score 404 may be a normalized score (e.g., normalized to a range of 1-100). In the data structure 400, features of sites and AP models have "All" 412, 416 as respective feature values. A feature value of "All" may indicate that all possible feature values for a feature are combined. In other words, the feature is determined to be not relevant to correlation determination between combinations and a performance metric. The scenario module 306 may facilitate reporting of scenarios that disproportionately affect the performance metric.

In some example implementations, the scenario module 306 may provide additional detailed data (e.g., additional telemetry data relating to network communications) that are associated with the scenario. After having determined one or more scenarios that disproportionately affect a performance metric, the scenario module 306 may query the data store 116 for the additional detailed data. The additional detailed data may relate to some features that were truncated by the parameterization module 202 of FIG. 2. For example, the additional detailed data may relate to access point manufacturer, network service provider, or the like. In some instances, the additional detailed data may be descriptive data specific to a customer, site, server, access point, firmware version, firmware installation date, or the like. The scenario module 306 may provide the additional detailed data in the data structure 400.

Figure 5A:
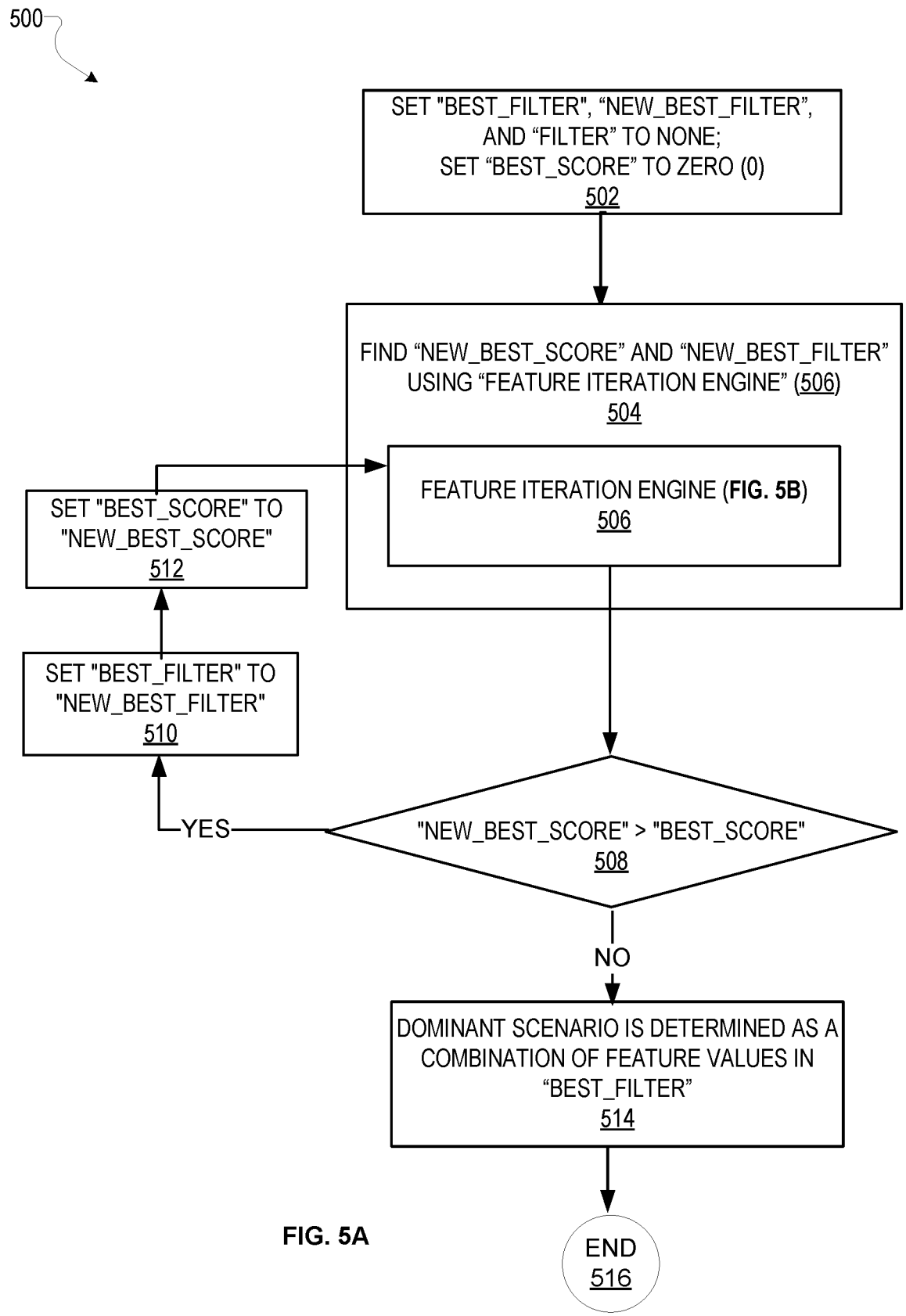
Figure 5B:
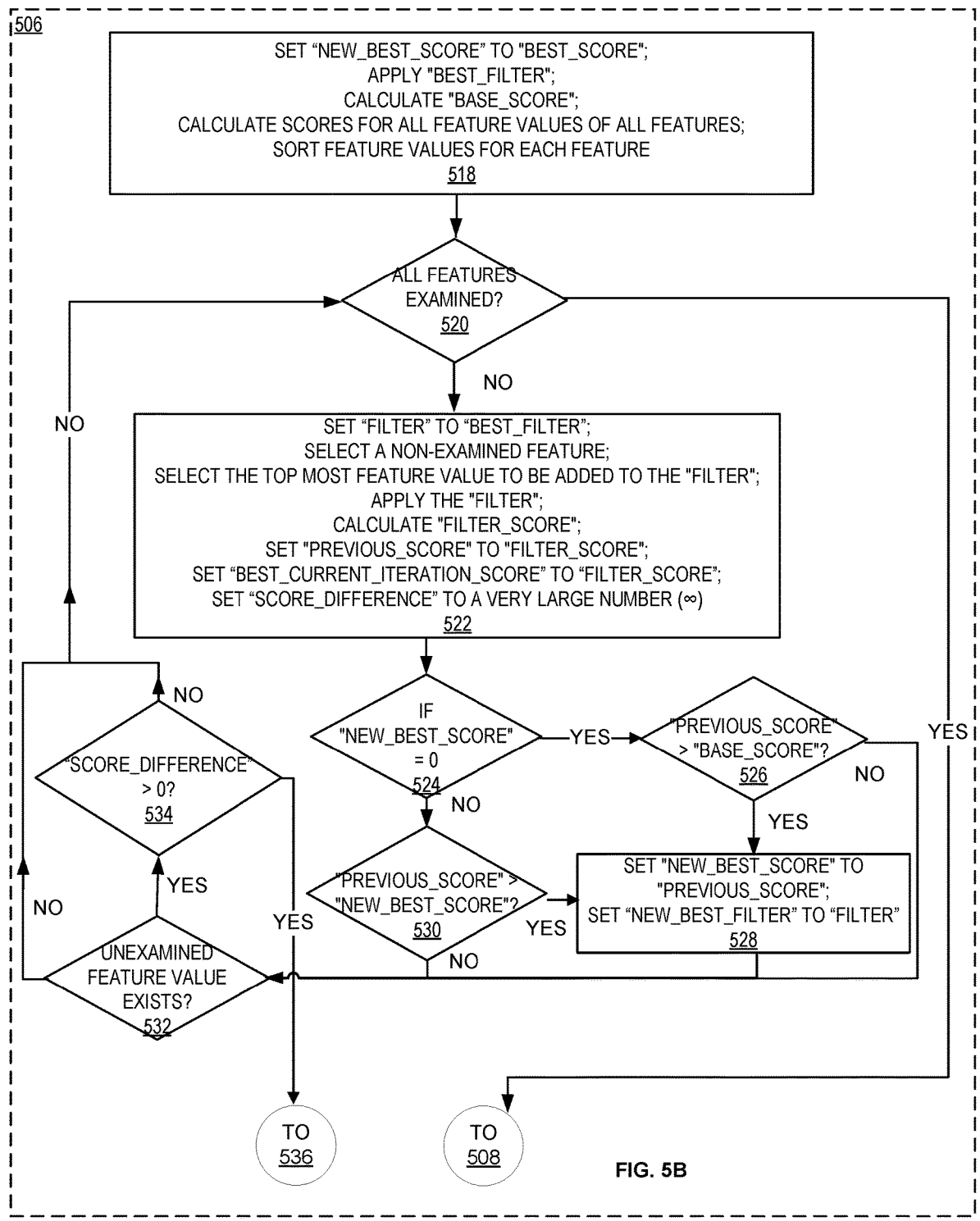

FIGS. 5A-5C illustrate an example flowchart 500 of a feature value combination process, according to example implementations of the present technology. The example flowchart 500 is implemented as a greedy algorithm but other algorithms may be employed for the feature value combination process. The goal of the example flowchart 500 is to find a filter (i.e., a combination of feature values) that best correlates with a particular performance metric (e.g., success or failure condition) and, thus, may represent a dominant scenario for the particular performance metric.

At block 502, a "filter", "best_filter", "new_best_filter", and a "best_score" may be initialized. The "filter", "best_filter", and "new_best_filter" may be set to null sets and the "best_score" may be set to zero (0). The "filter" may be a temporary filter used to incrementally add each feature value of a selected (i.e., examined) feature. The "best_filter" may be a combination of feature values that would represent the dominant scenario. The "new_best_filter" may build upon (e.g., provide in addition to) feature values already included in the "best_filter" and further add feature values of a particular feature, as determined after each iteration of a feature iteration engine 506 (illustrated in FIG. 5B), that may further increase the "best_score".

At block 504, a "new_best_score" and a "new_best_filter" that provides the "new_best_score" may be determined using the feature iteration engine 506. As will be described in further detail, the feature iteration engine 506 may update the "new_best_filter" that provides the "new_best_score".

At block 508, the "new_best_score" that was just determined by the feature iteration engine 506 may be evaluated against the "best_score". If the "new_best_score" is greater than the "best_score", then it may be determined that there remains possibility of finding a greater score. Thus, the greedy algorithm may proceed to block 510. On the other hand, if the "new_best_score" is not greater than the "best_score", then it may be determined that the "best_score" was indeed the greatest score found on a dataset and, thus, may represent the dominant scenario. In that case, the greedy algorithm may proceed to block 514.

At block 510, the "best_filter" may be set to the "new_best_filter". Thus, additional combination of feature values in the "new_best_filter" relating to the particular feature may be added to an existing combination of feature values in the "best_filter".

At block 512, the "best_score" may be set to the "new_best_score". This block 512 may ensure that the "best_score" maintains the greatest score thus far determined by the feature iteration engine 506 and may allow the block 508 to eventually proceed to the block 514.

At block 514, it may be determined that the dominant scenario is a combination of feature values in the "best_filter".

At block 516, the example flowchart 500 may terminate.

FIG. 5B illustrates inner workings of the feature iteration engine 506. The feature iteration engine 506 may examine all features for a combination of features and feature values that may increase correlation to a particular performance metric. The feature iteration engine 506 may be part of an iterative process where each iteration determines additional features and/or feature values to add to the "best_filter".

At block 518, the "new_best_score" may be set to the "best_score". The "best_filter" may be applied to the dataset to generate a filtered dataset that only contains data that match feature values in the "best_filter". A "base_score" may be calculated for the filtered dataset. Additionally, a score may be calculated for each feature value of each feature. Feature values for each feature may be sorted in order, such as in a decreasing order, based on respective associated scores.

At block 520, whether all features have been examined may be determined. Each unexamined feature may be examined to determine a combination of feature values of the feature that provides the greatest score for the feature. If it is determined that not all features are examined, the feature iteration engine 506 may proceed to block 522. Otherwise, the feature examination engine 506 may proceed to block 508.

At block 522, the "filter" may be set to the "best_filter". Additionally, a non-examined feature may be selected and the top most feature value of the selected feature may be added to the "filter". The top most feature value has the highest potential to increase the score due to the sorting performed in block 518. The updated "filter" may be applied to the dataset to generate a filtered dataset that only contains data that match feature values(s) in the "filter". A "filter_score" may be calculated for the filtered dataset. Additionally, "previous_score" may be set to the "filter_score" to keep track of starting score for the selected feature. Additionally, as block 522 is a start of an iteration for a feature, "best_current_iteration_score" may be set to "filter_score" and "score_difference" may be set to a very large number, such as infinity.

At block 524, whether the "new_best_score" is zero (0) may be determined. This case would occur for a fresh run of the feature value combination process of FIG. 5A. If the "new_best_score" is indeed zero (0), then the feature iteration engine 506 may proceed to block 526 where whether the "previous_score" is greater than "base_score" is determined. Otherwise, the feature iteration engine 506 may proceed to block 530.

At block 526, the feature iteration engine 506 may determine whether inclusion of any feature value (e.g., the top most feature value) of the selected feature provided a score that is greater than the "base_score". If such is the case, then the feature iteration engine 506 may proceed to block 528 to update the "new_best_score" with the "previous_score". Otherwise, the feature iteration engine 506 may skip block 528. In any event, the feature iteration engine 506 may proceed to block 532.

At block 530, whether the "previous_score" is greater than the "new_best_score" may be determined. If such is the case, then the feature iteration engine 506 may proceed to block 528 to update the "new_best_score" with the "previous_score." Otherwise, the feature iteration engine 506 may skip block 528. In any event, the feature iteration engine 506 may proceed to block 532.

At block 532, whether all feature values for the selected feature have been examined may be determined. If there are no remaining unexamined feature value for the selected feature (i.e., all feature values have been examined for the selected feature), then the feature iteration engine 506 may proceed to block 520 to determine whether all features have been examined. Otherwise, if there remains at least one unexamined feature value for the selected feature, the feature iteration engine 506 may proceed to block 534.

At block 534, whether the "score_difference" is greater than zero (0) may be determined. If only top most feature value had been examined thus far, because the "score_difference" was set to a very large value, this determination will be true. If the "score_difference" is greater than zero (0), then the feature determination engine 506 may proceed to block 536 where further feature values of the selected feature may be examined. Otherwise, the feature determination engine 506 may proceed to block 520 to determine whether all features have been examined.

FIG. 5C illustrates further inner workings of the feature iteration engine 506. FIG. 5C illustrates a portion of the feature iteration engine 506 that starts to add feature values of the selected feature to the "filter".

At block 536, the top most unselected feature value of the selected feature may be selected and added to the "filter". The updated "filter" may be applied to the dataset to generate a subset of the dataset. The "filter_score" may be calculated for the subset and the "filter_score" may be updated. "Current_score" may be set to the "filter_score".

At block 538, whether the "current_score" is greater than the "best_current_iteration_score" may be determined. If such is the case, the feature iteration engine 506 proceeds to block 540. Otherwise, the feature iteration engine 506 may proceed to block 542.

At block 540, the "best_current_iteration_score" may be updated to the "current_score". After the update, the feature iteration engine 506 may proceed to block 542.

At block 542, whether the "current_score" is greater than the "new_best_score" may be determined. If such is the case, then the feature iteration engine 506 proceeds to block 544. Otherwise, the feature iteration engine 506 may proceed to block 546.

At block 544, the "best_current_iteration_score" may be updated to the "current_score". The "new_best_filter" may be set to the "filter". The feature iteration engine 506 may proceed to block 546.

At block 546, the "score_difference" may be set to a quantity of the "best_current_iteration_score" minus the "previous_score". The feature iteration engine 506 may then proceed to block 532 of FIG. 5B to determine whether all features have been examined.

The blocks in FIGS. 5A-5C are exemplary only, and other implementations are possible. Other implementations may include additional or fewer blocks. Further, different orderings of the blocks are also contemplated.

Figure 6A:
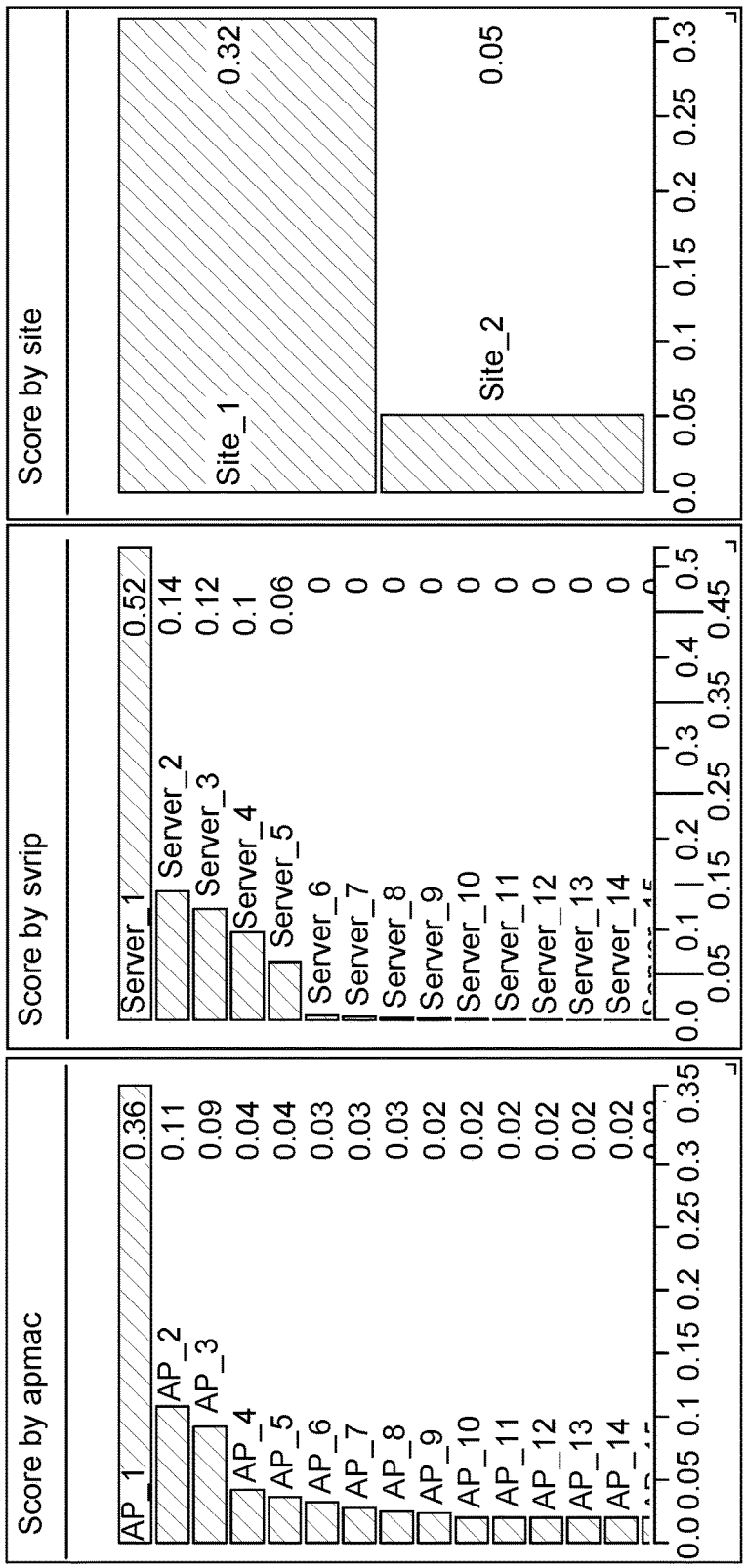
FIGS. 6A-6F illustrate example feature value combination on a dataset, according to example implementations of the present technology.
Figure 6B:
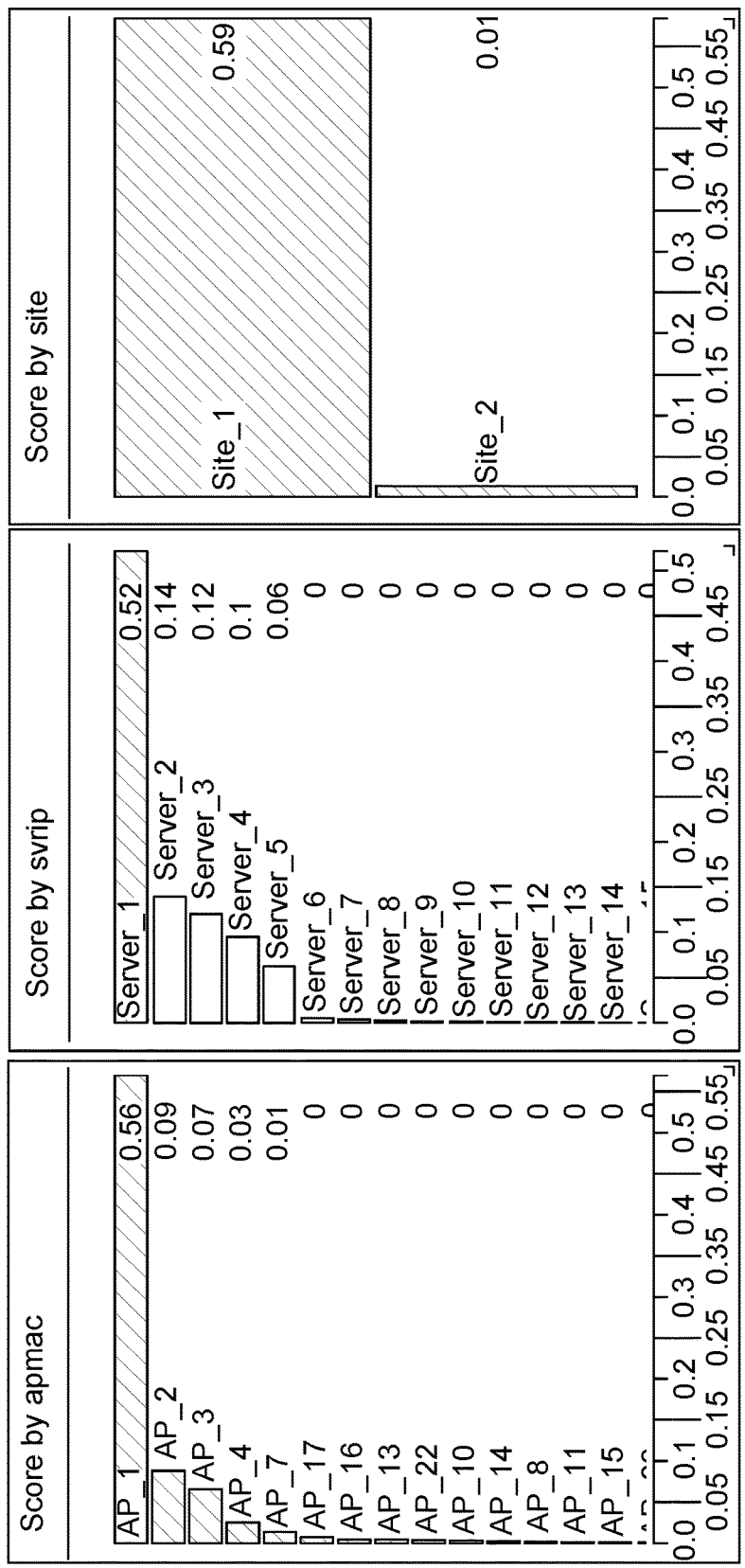
Figure 6C:
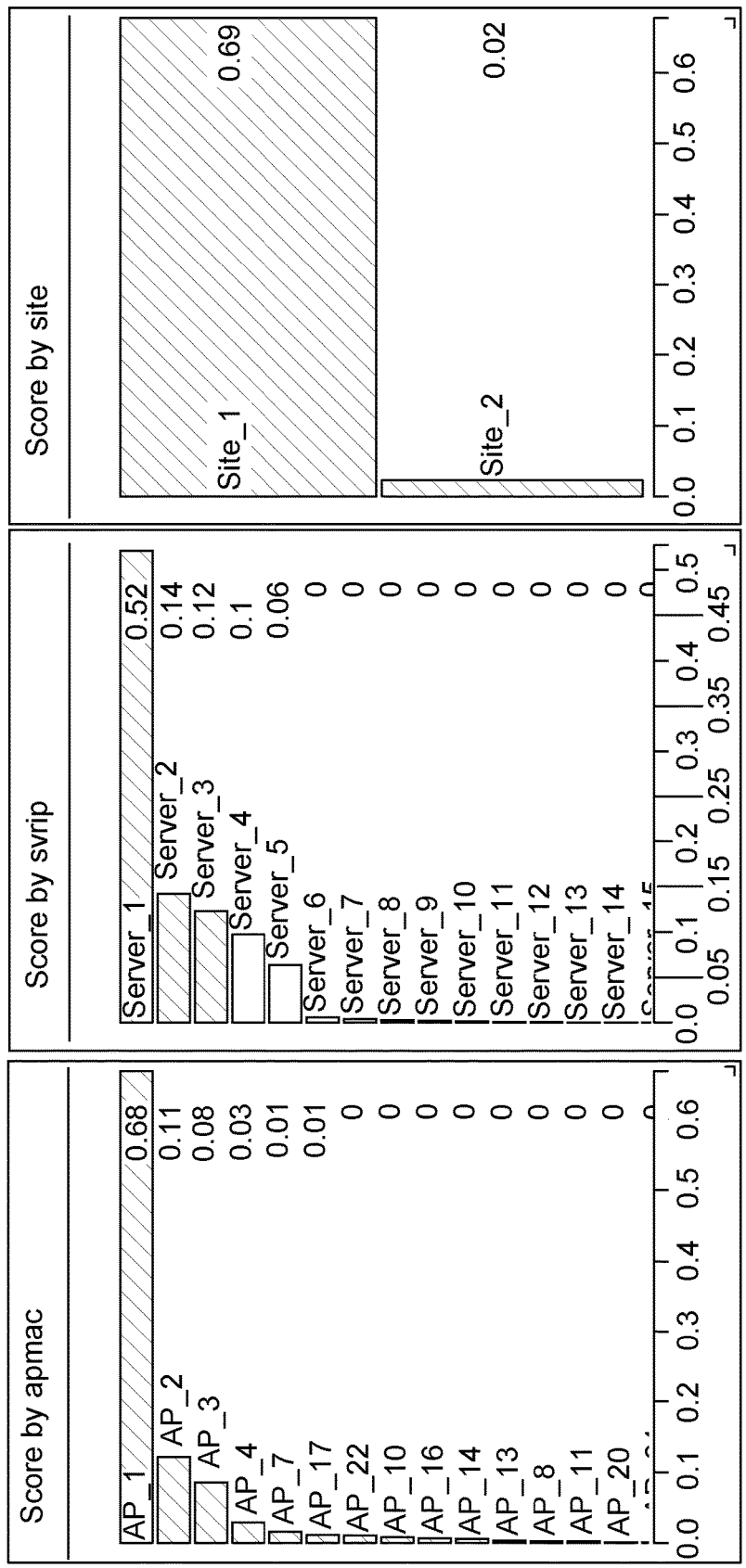
Figure 6D:
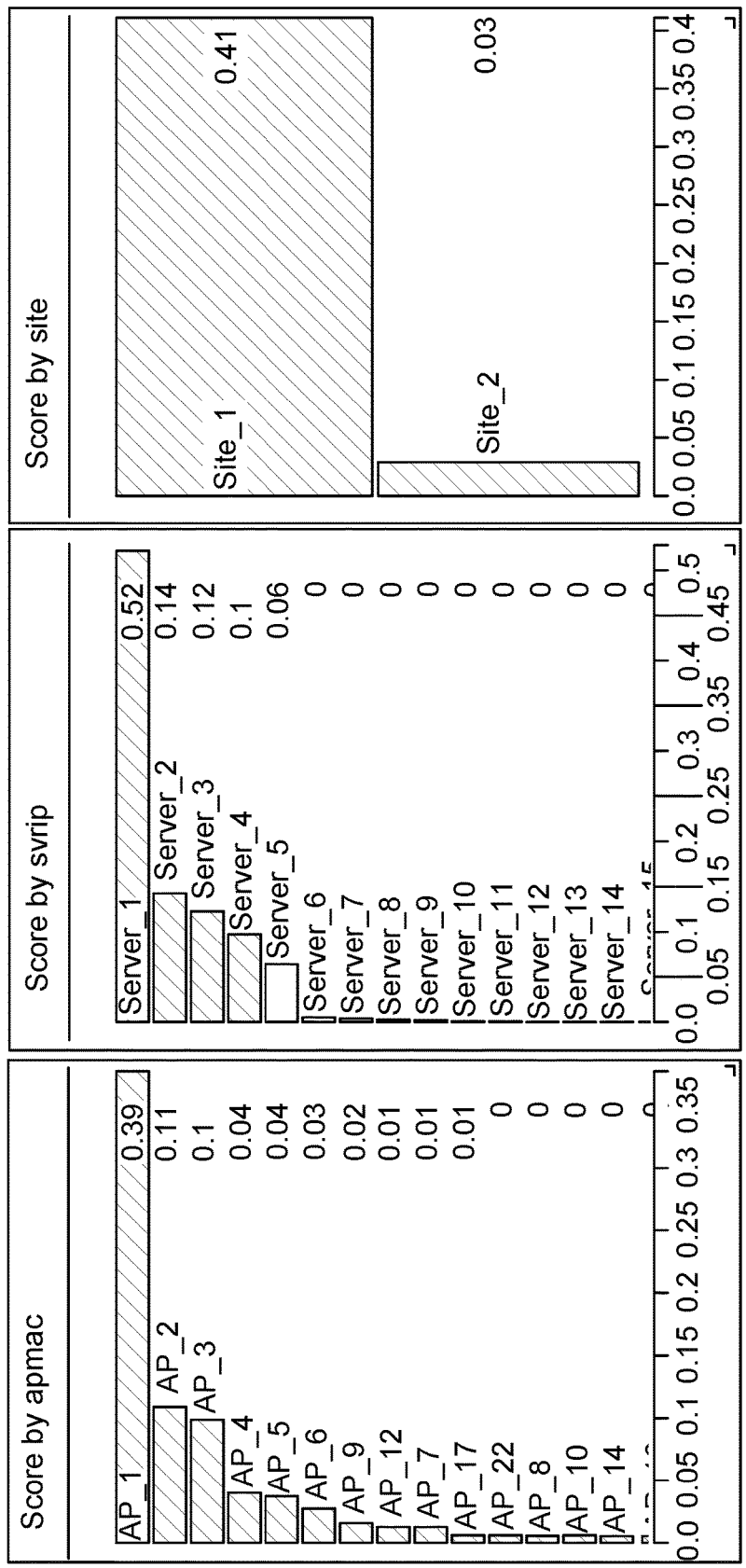
Figure 6E:
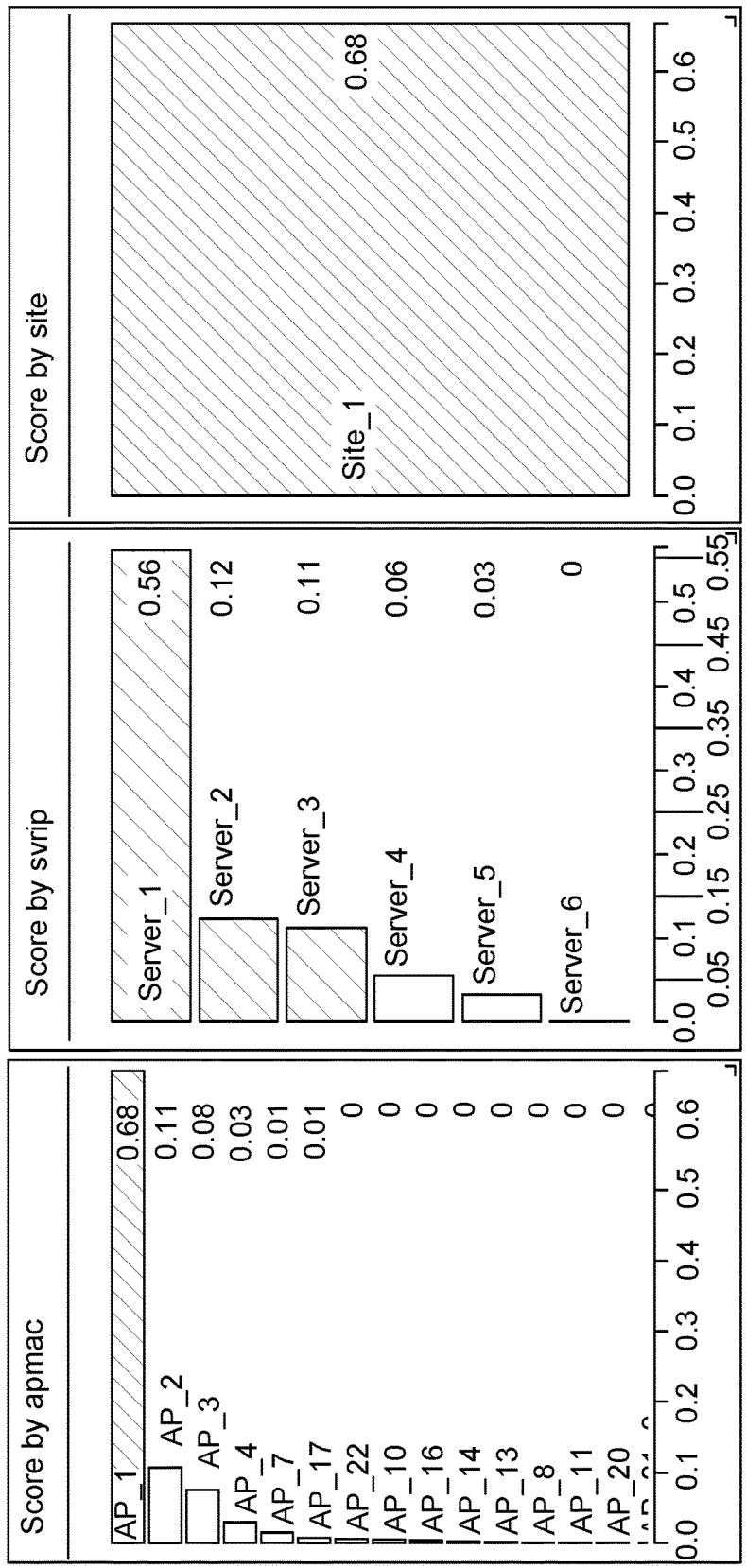
Figure 6F:
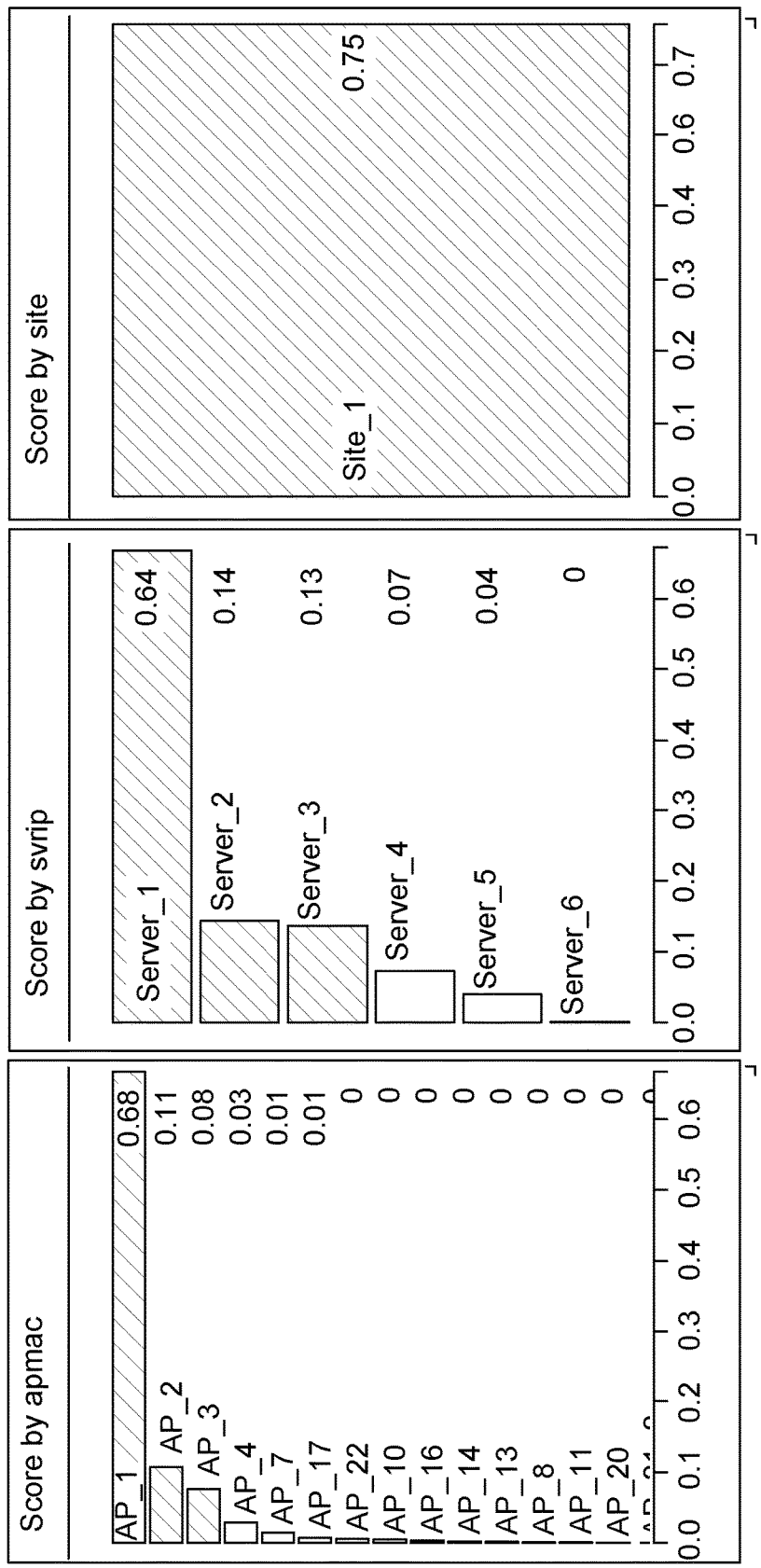

FIGS. 6A-6F are illustrative example feature value combination on a dataset, according to example implementations of the present technology. FIG. 6A illustrates initialization of the feature value combination process. FIGS. 6B-6D illustrate combination of values in a first iteration (i.e., getting to block 520 of FIG. 5B for the first time) of the feature value combination process. FIGS. 6E-6F illustrate a second iteration of the feature value combination process (i.e., getting to block 520 of FIG. 5B for the second time).

The example steps are described with a dataset having three different features, access point MAC address (Apmac), server IP address (Svrip), and site (Site). The example steps are performed to determine a scenario that best correlates with a failure condition. While the failure condition is used in the examples, it should be appreciated that other performance metric may be used for application of the feature value combination process in different contexts. For example, other binary conditions such as a success condition or even non-binary conditions such as SNR may be used in the feature value combination process.

FIG. 6A illustrates initialization of the feature value combination process. Initially, a "base_score" is calculated for the dataset with no filters applied to any of the features. In other words, for a failure rate calculated according to Eq. 1, the denominator is a number of all network communications in the dataset and the numerator is a total number of all network communications in the dataset that resulted in the failure condition. For a failure fraction calculated according to Eq. 2, the denominator is a total number of failures attributable to all possible combinations in the dataset and the numerator is a total number of failures attributable to all possible combinations in the dataset. When accounting for the entire dataset, the denominator and the numerator are the same for the failure fraction. Thus, the failure fraction is 1 for the entire dataset. The "base_score" calculated according to Eq. 3 using the failure rate and the failure fraction is 0.21 at this step. The "new_best_score" (e.g., a score with maximum value) is temporarily set to the "base_score" and tracked.

Additional scores are calculated for feature values of each feature using the dataset. For example, in the leftmost column corresponding to "Apmac", a score of 0.36 is calculated for a first feature value "AP_1". The score is calculated according to Eq. 1, Eq. 2, and Eq. 3 using a subset of the dataset generated by applying a filter for the first feature value. In other words, to calculate the score for the first feature value, a combination of {"AP_1", ALL, ALL} is applied as a filter. For a score that corresponds to the feature value "AP_1", a failure rate calculated according to Eq. 1 has the denominator that is a total number of network communications that has "AP_1" as a feature value for the "Apmac" feature. The failure rate has the numerator that is a total number of failed network communications that has "AP_1" as the feature value. A failure fraction calculated according to Eq. 2 has the denominator that is a total number of failures attributable to any combinations in the subset and the numerator that is a total number of failed network communications that has "AP_1" as the feature value in the subset. The score (i.e., 0.36) calculated based on the failure rate and the failure fraction indicates a level of correlation between the feature value "AP_1" and failed network communications. A score may be calculated for each feature value of the "Apmac" feature. Further, the same process may be used to calculate scores for feature values of other features, including "Svrip" and "Site" features.

Each of feature values may be sorted in a sorted list of feature values. For example, FIG. 6A illustrates "AP_1" associated with a score 0.36 at the top followed by "AP_2" associated with a lesser score 0.11 followed by "AP_3" associated with yet lesser score 0.09. Thus, the sorted list of feature values may rank feature values according to strengths of correlations to network communication failures. Similarly, feature values of other features may be sorted into respective sorted lists.

FIGS. 6B-6D illustrate combination of values in a first iteration of the feature value combination process. More specifically, FIGS. 6B-6D illustrate a feature value combination process. In FIG. 6B, the feature value combination process selects a feature to examine. The "Svrip" feature and a top level feature value of "Server_1" in a sorted list for the feature are selected (i.e., the feature value that has the best score in the desired feature). The selected feature value is applied as a filter on feature vectors of the dataset to generate a filtered dataset that includes all network communications that are associated with {Site: [All], Svrip: [Server_1], Apmac: [All]}. The filtered dataset is used for calculation of a new score (i.e., a "filter_score"). The "filter_score" calculated according to Eq. 3 for the filtered dataset is 0.52. The "filter_score" is compared against a previous "new_best_score". If the "filter_score" is greater than the previous "new_best_score", the previous "new_best_score" is updated with the "filter_score" and the selected feature value is added to "filter" and the "new_best_filter" is set to "filter" and tracked. Otherwise, the previous "new_best_score" is not updated and the selected feature value added to the "filter". Here, the "filter_score" is 0.52 which is greater than the previous "new_best_score" of 0.21. Thus, the "new_best_score" is updated with the "filter_score" of 0.52 and the feature value of "Server_1" is tracked as the filter.

Scores are calculated for feature values of unselected features using the filtered dataset. Each of feature values may be sorted in a sorted list of associated feature values based on the updated scores.

FIG. 6C illustrates the next couple steps in the feature value combination process. The feature value combination process determines whether there are more feature values in the selected feature, which is "Svrip" here. If there are more feature values, the next feature value in a sorted list for the feature is added to a previous "filter". In FIG. 6B, a "filter" of {Site: [All], Svrip: [Server_1], Apmac: [All]} was used. Here, the next feature value of "Server_2" in a sorted list of "Svrip" feature is added to the previous "filter" to provide a new "filter" of {Site: [All], Svrip: [Server_1, Server_2], Apmac: [All]}. The new "filter" is applied to the dataset to generate a filtered dataset that includes all network communications that are associated with {Site: [All], Svrip: [Server_1, Server_2], Apmac: [All]}. The filtered dataset is used for calculation of a "filter_score". The new score calculated according to Eq. 3 for the filtered dataset is 0.57 (not shown). The "filter_score" is compared against the previous "new_best_score". If the "filter_score" is greater than the previous "new_best_score", the "new_best_score" is updated with the "filter_score", the next feature value is added to the "filter", and "new_best_filter" is updated with the "filter". Otherwise, the previous "new_best_score" is not updated and the next feature value is not added to the "filter". Here, the "filter_score" is 0.57 which is greater than the previous "new_best_score" of 0.52. Thus, the "new_best_score" is updated with the "filter_score" of 0.57 and the next feature value of "Server_2" is added to the "filter". Now the "filter" and "new_best_filter" become {Site: [All], Svrip: [Server_1, Server_2], Apmac: [All]}.

The feature value combination process is repeated for the following feature values in the sorted list of the feature. In FIG. 6C, feature value combination process again determines whether there are more feature values in the selected feature. The next feature value of "Server_3" in a sorted list of "Svrip" feature is added to the "filter" to provide a new "filter" of {Site: [All], Svrip: [Server_1, Server_2, Server_3], Apmac: [All]}. The new "filter" is applied to the dataset to generate a filtered dataset that includes all network communications that are associated with {Site: [All], Svrip: [Server_1, Server_2, Server_3], Apmac: [All]}. The filtered dataset is used for calculation of a "filter_score". The "filter_score" calculated according to Eq. 3 for the filtered dataset is 0.58 (shown in FIG. 6C), which is greater than the "new_best_score" of 0.57. The "new_best_score" is updated with the "filter_score" and the next feature value of "Server_3" is added to the "filter". Now the "filter" and the "new_best_filter" become {Site: [All], Svrip: [Server_1, Server_2, Server_3], Apmac: [All]}.

The feature value combination process is repeated until the "filter_score" calculated for a filtered dataset applying a "filter" further comprising the next feature value is less than the previous "filter_score". FIG. 6D illustrates such context. In FIG. 6D, the feature value combination process again determines whether there are more feature values in the selected feature. Here, the next feature value of "Server_4" in a sorted list of "Svrip" feature is added to the filter" to provide a new "filter" of {Site: [All], Svrip: [Server_1, Server_2, Server_3, Server_4], Apmac: [All]}. The new "filter" is applied to the dataset to generate a filtered dataset that includes all network communications that are associated with {Site: [All], Svrip: [Server_1, Server_2, Server_3, Server_4], Apmac: [All]}. The filtered dataset is used for calculation of a "filter_score". The "filter_score" calculated according to Eq. 3 for the filtered dataset is 0.36, which is less than the previous "filter_score" of 0.57. Since the new "filter_score" is less than the previous "filter_score", the "new_best_score" is not updated and the feature value combination process terminates for the feature. The feature value combination process maintains the "new_best_score" of 0.57 and the "new_best_filter" of {Site: [All], Svrip: [Server_1, Server_2, Server_3], Apmac: [All]} obtained by applying the feature value combination process to "Svrip" feature.

The feature value combination process selects each of the other features and repeats the feature value combination process. For example, the feature value combination process may select the "Apmac" feature and apply the feature value combination process. In other words, a top level feature value (i.e., the feature value that has the best score in the desired feature) is selected from the "Apmac" feature and a filtered dataset is generated based on the top level feature value. A "filter_score" is calculated for the filtered dataset. The next feature value of the feature is added to the "filter" to generate a new filtered set. A new "filter_score" is calculated for the new filtered set and the "filter_score" is compared against the "new_best_score". When the "filter_score" is greater than the "new_best_score", the "new_best_score" is replaced with the "filter_score". Also, the next feature value is added to the "filter" and "new_best_filter" are updated. The feature value combination process continues until adding the next feature value results in decrease of the "filter_score". The same process is repeated for the "Site" feature.

In some other example implementations, the selection of a next feature value to examine may be for a feature value that is different from a feature value in the next position in the sorted list. Further, in some example implementations, the feature value combination process may try all the other feature values of the feature to find a second feature that best correlates with the score.

At the end of the feature value combination processes, respective "new_best_score" calculated for the features are compared. The highest "new_best_score" and the "new_best_filter" comprising feature values of a feature associated with the best score are kept. Here, the "Svrip" feature is associated with the "new_best_score" of 0.57. Thus, the highest "new_best_score" for the "Svrip" feature and an associated "new_best_filter" of {Site: [All], Svrip: [Server_1, Server_2, Server_3], Apmac: [All]} are kept. The first iteration of the feature value combination process terminates as the process has reached to block 520 of FIG. 5B.

FIGS. 6E-6F illustrate a second iteration of the feature value combination process. In the second iteration, a previous "new_best_filter" comprising feature values of a feature associated with the "new_best_score" of the first iteration is applied to the dataset. In FIG. 6E, a top feature value from a different feature is selected and a feature value combination process described in relation to FIGS. 6B-6D is applied to the different feature. In FIG. 6E, the "Apmac" feature is selected as the different feature. For the top level feature value of "AP_1" (i.e., the feature value that has the best score in the "Apmac" feature), a "filter_score" calculated according to Eq. 3 on the filtered dataset is 0.68. The "filter_score" is greater than the "new_best_score" of the first iteration. Accordingly, the top level feature value is added to the "filter" and the "new_best_filter" is updated to {Site: [All], Svrip: [Server_1, Server_2, Server_3], Apmac: [AP_1]}.

In FIG. 6F, following the feature value combination process, additional feature values of "AP_2" and "AP_3" are further added to the "filter" to get {Site: [All], Svrip: [Server_1, Server_2, Server_3], Apmac: [AP_1, AP_2, AP_3]}. The associated "filter_score" is 0.75 so the "new_best_score" and "new_best_filter" are both updated. Adding any more feature values of the "Apmac" feature results in a decreased "filter_score". Thus, the feature value combination process terminates examination of the "Apmac" feature.

The feature value combination process may examine remaining features. Here, the "Svrip" feature is already associated with the previous iteration and the "Apmac" feature has been just examined. Thus, the remaining "Site" feature is examined. However, since there is only one "Site" feature value remaining in the filtered dataset (i.e., "Site_1"), there is no additional feature value to add to the "filter" so the feature value combination process terminates the second iteration (i.e., the process follows "NO" flow at block 532 of FIG. 5B to arrive at block 520 of FIG. 5B). Also since there is no more feature to be examined at block 520 of FIG. 5B, the process goes to block 508 of FIG. 5A.

Since the "new_best_score" has been updated in the feature iteration engine, the process follows "YES" flow at block 508 and eventually enters block 506 for the second time. However, since all features are already examined, the process follows "YES" flow at block 520 and immediately get back to block 508 again. At this point the "new_best_score" has not been updated so, the process follows "NO" flow at block 508 this time and the feature value combination process terminates.

As described above with respect to the combination module 204 of FIG. 3, the feature value combination process may terminate under many conditions. One termination condition is convergence of a new score associated with a combination that provides the strongest correlation in the current iteration with a previous score associated with a combination that provides the strongest correlation in a previous iteration. Another termination condition is a first filter from a previous iteration that provided a best score being identical to a second filter determined in the current iteration that provides a best score. Yet another termination condition may be a determination that the best score determined in an iteration does not result in an increased score over a previous best score (e.g., as illustrated at block 508 of FIG. 5A). Once the termination condition is satisfied, the feature value combination process may provide the best score and an associated filter comprising feature values that provided the best score to the scenario module 306.

Figure 7:
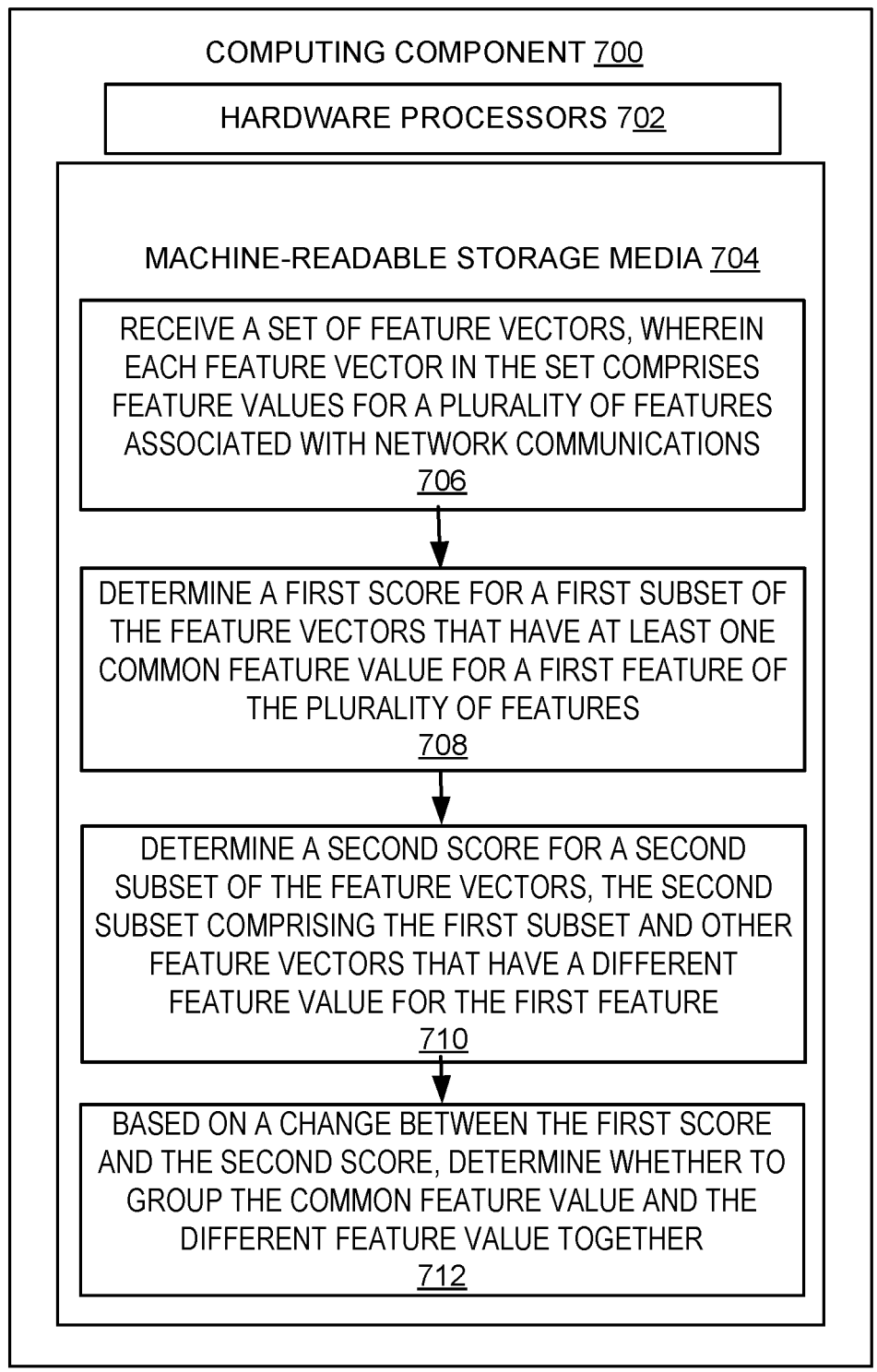
FIG. 7 depicts a set of executable instructions stored in machine-readable storage media that, when executed, cause one or more hardware processors to perform an illustrative method for combining feature values according to example implementations of the invention.

FIG. 7 depicts a computing component 700 that includes one or more hardware processors 702 and machine-readable storage media 704 storing a set of machine-readable/machine-executable instructions that, when executed, cause the hardware processors 702 to perform an illustrative method for combining feature values according to example implementations of the invention. The computing component 700 may be, for example, the computing system 800 depicted in FIG. 8 or another computing device described herein. The hardware processors 702 may include, for example, the processor(s) 804 depicted in FIG. 8 or any other processing unit described herein. The machine-readable storage media 704 may include the main memory 806, the read-only memory (ROM) 808, the storage 810, or any other suitable machine-readable storage media described herein.

At block 706, in example implementations, instructions of the scenario correlation determination engine 112 are executed by the hardware processors 702 to receive a set of feature vectors. Each feature vector in the set may comprise feature values for a plurality of features associated with network communications.

At block 708, in example implementations, instructions of the scenario correlation determination engine 112 may be executed by the hardware processors 702 to determine a first score for a first subset of the feature vectors that have at least one common feature value for a first feature of the plurality of features.

At block 710, in example implementations, instructions of the scenario correlation determination engine 112 may be executed by the hardware processors 702 to determine a second score for a second subset of the feature vectors. The second subset may comprise the first subset and other feature vectors that have a different feature value for the first feature.

At block 712, in example implementations, instructions of the scenario correlation determination engine 112 may be executed by the hardware processors 702 to determine whether to group the common feature value and the different feature value together based on a change between the first score and the second score.

Figure 8:
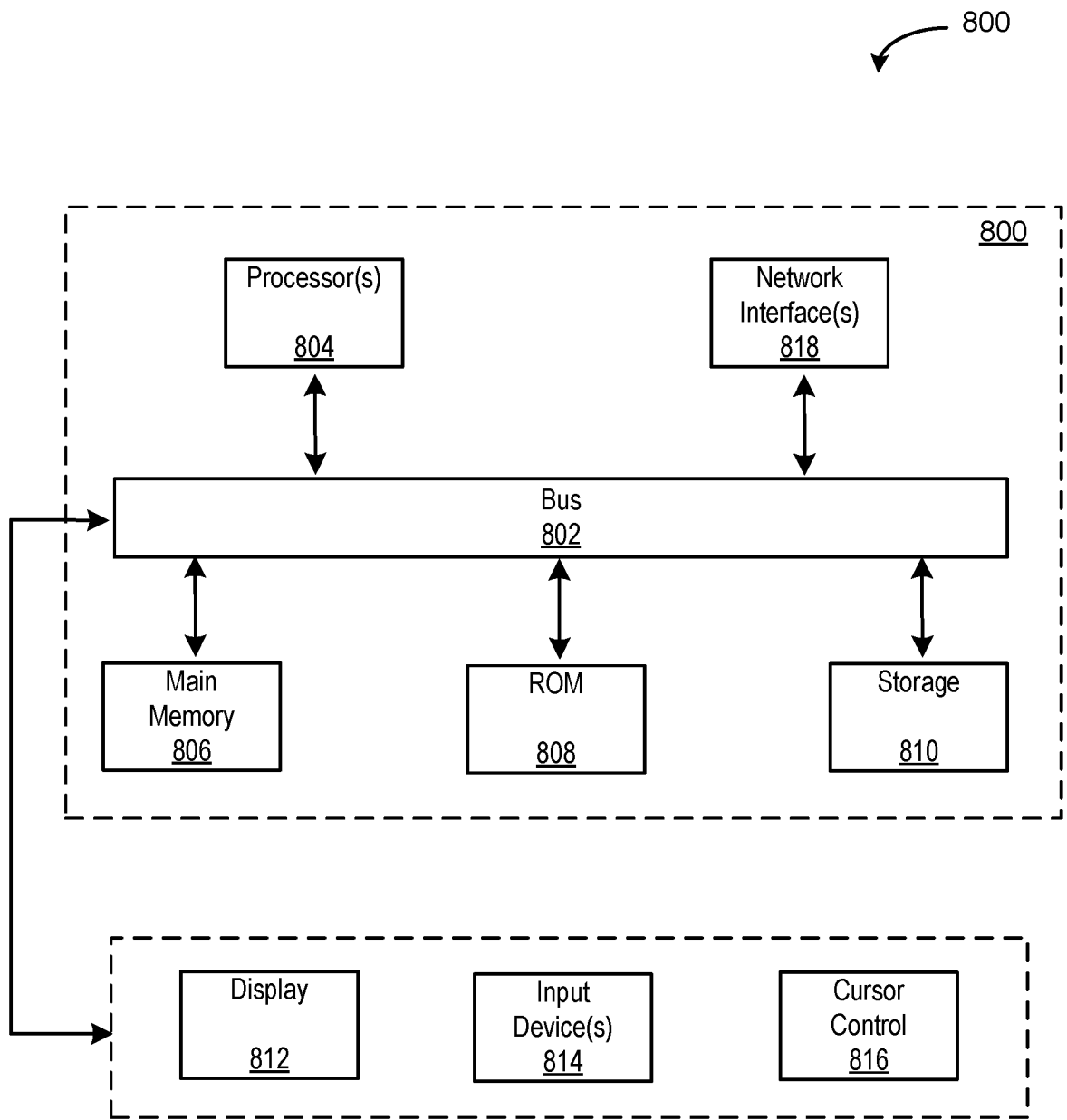
FIG. 8 is an example computing component that may be used to implement various features of example implementations described in the present disclosure.

FIG. 8 depicts a block diagram of an example computer system 800 in which various of the example implementations described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), or the like, is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some example implementations, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Any of the aforementioned engines or modules may be embodied as a computing component of the computing system 800. For example, the scenario correlation determination engine 112 of FIG. 1 and FIG. 2, parameterization module 202, combination module 204, insights module 206 of FIG. 2, and the metric calculation module 302, feature value inclusion module 304, and scenario module 306 of FIG. 3 may be embodied as a computing component of the computing system 800.

In general, the word "component," "engine," "system," "database," data store," and the like, as used herein, may refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one example implementation, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative example implementations, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media may also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 may send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto may be performed in other sequences that are appropriate, or may be performed in parallel, or in some other manner. Blocks or states may be added to or removed from the disclosed example implementations. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described may be shared in part or in total among one or more circuits. Even though various features or elements of functionality may be individually described or claimed as separate circuits, these features and functionality may be shared among one or more common circuits, and such description shall not require or imply that separate circuits are required to implement such features or functionality. Where a circuit is implemented in whole or in part using software, such software may be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "may," "could," "might," or "may," unless specifically stated otherwise, or otherwise understood within the context as used, is generally intended to convey that certain example implementations include, while other example implementations do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:
1. A method comprising:
   determining that a set of network elements and parameters is involved with a portion of network traffic that is dropped when the network traffic travels between network elements in the set of network elements;
   receiving a set of feature vectors associated with the portion of network traffic that is dropped when the network traffic travels between the network elements, wherein each feature vector in the set of feature vectors comprises feature values for a plurality of features associated with the network traffic;
   determining a first score for a first subset of the set of feature vectors that have a common feature value for a first feature of the plurality of features;
   determining a second score for a second subset of the set of feature vectors, the second subset comprising the first subset and other feature vectors that have a different feature value for the first feature; and
   when the second score is greater than the first score, generating a recommendation of a remedial action that updates firmware of the set of network elements.
2. The method of claim 1, further comprising:
   grouping the common feature value and the different feature value together, wherein the grouping of the common feature value and the different feature value collectively represents a subset of the set of network elements with a shared network configuration.
3. The method of claim 2, further comprising:
   generating a recommendation of a remedial action based on the group of feature values.

4. The method of claim 1, wherein the determining the first score for the first subset of the feature vectors comprises:
calculating the first score based on a failure rate and a failure fraction associated with the common feature value, wherein the failure rate is defined based on a total number of failures in the first subset in relation to a total number of attempts in the first subset and the failure fraction is defined as a total number of failures in the first subset in relation to the total number of failures for the network traffic.

5. The method of claim 4, wherein the first score is a harmonic mean of the failure rate and the failure fraction.

6. The method of claim 5, wherein the harmonic mean is adjusted with a weight applied to at least one of the failure rate or the failure fraction.

7. The method of claim 1, further comprising:
for each feature value associated with the first feature, determining a corresponding subset of feature vectors that have the feature value for the first feature; and
determining a corresponding score for the feature value.

8. The method of claim 7, further comprising:
sorting the feature value in a sorted list of feature values associated with the first feature based on the corresponding score.

9. The method of claim 8, wherein the common feature value is selected based on a position of the common feature value in the sorted list and the different feature value is selected based on a different feature value having a next position to the position in the sorted list.

10. The method of claim 1, further comprising:
determining a filter comprising at least the common feature value that, when applied to the set of feature vectors, results in the first subset.

11. The method of claim 10, further comprising:
upon determining that the second score is greater than the first score, updating the filter to include the different feature value.

12. The method of claim 11, wherein the feature vectors are associated with a performance metric, the method further comprising:
providing a group of feature values comprising the common feature value and the different feature value as a set of feature values that has greater correlation with the performance metric than other groups of feature values that do not comprise the common feature value and the different feature value;
apply the filter to the set of the feature vectors to determine a filtered set empty of feature vectors associated with the filter; and
providing a second group of feature values remaining in the filtered set as a second set of feature values that has greater correlation with the performance metric than other groups of feature values in the filtered set that do not comprise feature values in the second group of feature values.

13. The method of claim 12, further comprising:
determining a third score for a third subset of the feature vectors that have at least one second common feature value for a second feature of the plurality of features; and
based on a change between the second score and the third score, determining whether to update the filter to include the second common feature value.

14. The method of claim 1, wherein the feature vectors are associated with a performance metric, the method further comprising:

providing a group of feature values comprising the common feature value and the different feature value as a set of feature values that has greater correlation with the performance metric than other groups of feature values that exclude the different feature value.

15. The method of claim 14, wherein the group of feature values identifies a scenario, the method further comprising:
querying a data store for additional data associated with at least one feature vector defined by at least one feature value of the group of feature values; and
providing the additional data in association with the group of feature values.

16. The method of claim 14, wherein the performance metric comprises at least one of a binary feature value and a non-binary feature value.

17. The method of claim 1, wherein a feature of a feature vector is associated with a continuous range of feature values, the method further comprising:
translating feature values of the feature to a discrete range of feature values based on statistics associated with peer networks for the feature.

18. The method of claim 1, wherein the determining the first score for the first subset of the feature vectors comprises:
calculating the first score based on a success rate and a success fraction associated with the common feature value, wherein the success rate is defined based on a total number of successes in the first subset in relation to a total number of attempts in the first subset and the success fraction is defined as a total number of successes in the first subset in relation to the total number of successes for the network traffic.

19. A system comprising:
a processor; and
a non-transitory storage medium storing instructions that, when executed on the processor, performs a method comprising:
determining that a set of network elements and parameters is involved with a portion of network traffic that is dropped when the network traffic travels between network elements in the set of network elements;
receiving a set of feature vectors associated with the portion of network traffic that is dropped when the network traffic travels between the network elements, wherein each feature vector in the set of feature vectors comprises feature values for a plurality of features associated with the network traffic;
determining a first score for a first subset of the set of feature vectors that have a common feature value for a first feature of the plurality of features;
determining a second score for a second subset of the set of feature vectors, the second subset comprising the first subset and other feature vectors that have a different feature value for the first feature; and
when the second score is greater than the first score, generating a recommendation of a remedial action that updates firmware of the set of network elements.

20. A non-transitory machine-readable storage medium storing instructions that upon execution cause a system to perform a method comprising:
determining that a set of network elements and parameters is involved with a portion of network traffic that is dropped when the network traffic travels between network elements in the set of network elements;
receiving a set of feature vectors associated with the portion of network traffic that is dropped when the network traffic travels between the network elements, wherein each feature vector in the set of feature vectors comprises feature values for a plurality of features associated with the network traffic;
determining a first score for a first subset of the set of feature vectors that have a common feature value for a first feature of the plurality of features;
determining a second score for a second subset of the set of feature vectors, the second subset comprising the first subset and other feature vectors that have a different feature value for the first feature; and
when the second score is greater than the first score, generating a recommendation of a remedial action that changes an internet service provider (ISP) for the set of network elements.

21. A method comprising:
determining that a set of network elements and parameters is involved with a portion of network traffic that is dropped when the network traffic travels between network elements in the set of network elements;
receiving a set of feature vectors associated with the portion of network traffic that is dropped when the network traffic travels between the network elements, wherein each feature vector in the set of feature vectors comprises feature values for a plurality of features associated with the network traffic;
determining a first score for a first subset of the set of feature vectors that have a common feature value for a first feature of the plurality of features;
determining a second score for a second subset of the set of feature vectors, the second subset comprising the first subset and other feature vectors that have a different feature value for the first feature; and
when the second score is greater than the first score, generating a recommendation of a remedial action that changes an internet service provider (ISP) for the set of network elements.

* * * * *